United States Patent
Harel et al.

(10) Patent No.: US 9,729,220 B1
(45) Date of Patent: Aug. 8, 2017

(54) TRANSMIT DIVERSITY AND RECEIVE DIVERSITY FOR SINGLE CARRIER MODULATION

(71) Applicant: Ceragon Networks Ltd., Tel-Aviv (IL)

(72) Inventors: Oz Harel, Tel-Aviv (IL); Isaac Rosenhouse, Kiryat-Ono (IL); Haggai Mizrahi, Hod-HaSharon (IL); Gur Ballas, Tel-Mond (IL)

(73) Assignee: Ceragon Networks Ltd., Tel-Aviv (IL)

( * ) Notice: Subject to any disclaimer, the term of this patent is extended or adjusted under 35 U.S.C. 154(b) by 0 days.

(21) Appl. No.: 15/057,187

(22) Filed: Mar. 1, 2016

(51) Int. Cl.
*H04B 7/06* (2006.01)
*H04B 7/08* (2006.01)

(52) U.S. Cl.
CPC ......... *H04B 7/0617* (2013.01); *H04B 7/0817* (2013.01)

(58) Field of Classification Search
CPC .. H04B 7/0617; H04B 7/0817; H04B 1/0003; H04L 5/0007
See application file for complete search history.

(56) References Cited

U.S. PATENT DOCUMENTS

| | | | | |
|---|---|---|---|---|
| 8,374,273 B1* | 2/2013 | Zhang | .............. | H04B 7/0617 375/259 |
| 2005/0117660 A1* | 6/2005 | Vialle | .............. | H04B 1/7115 375/299 |
| 2011/0026421 A1* | 2/2011 | Luo | .............. | H04B 7/024 370/252 |
| 2012/0140849 A1* | 6/2012 | Bercovich | .............. | H04L 25/0204 375/296 |
| 2014/0126664 A1 | 5/2014 | Mizrahi et al. | | |
| 2015/0303950 A1* | 10/2015 | Shattil | .............. | H04B 1/0003 370/328 |
| 2016/0094318 A1* | 3/2016 | Shattil | .............. | H04L 5/0007 375/267 |

OTHER PUBLICATIONS

Matsuda et al. "Downlink Transmit Diversity for Broadband Single-Carrier Distributed Antenna Network", 71st IEEE Vehicular Technology Conference, VTC 2010—Spring, Taipei, Taiwan, May 16-19, 2010, p. 1-5, May 2010.

* cited by examiner

*Primary Examiner* — Syed Haider

(57) ABSTRACT

A single-carrier-modulation communication system for transmitting data over a wireless link, the communication system including, on a first side of a wireless link one single-carrier-modulation receiver associated with a single antenna, on a second side of the wireless link a plurality of antennas and a plurality of single-carrier-modulation transmitters, each one of the plurality of transmitters associated with one of the plurality of antennas, the transmitters each further associated with a pre-coding filter, and the plurality of transmitters are arranged to each transmit same data via a respectively associated pre-coding filter and the associated antenna, using the pre-coding filters to perform beamforming to the one receiver. Related apparatus and methods are also described.

19 Claims, 16 Drawing Sheets

TRANSMIT DIVERSITY AND RECEIVE DIVERSITY FOR SINGLE CARRIER MODULATION

FIELD AND BACKGROUND OF THE INVENTION

The present invention, in some embodiments thereof, relates to methods and systems for transmitting data over a single carrier wireless link, and more particularly, but not exclusively, to transmitting data over a single carrier wireless link using transmit diversity and/or receive diversity and achieving a form of space diversity.

Wireless point-to-point communication systems are deployed all over the world as a backbone of cellular networks and wireless Internet services. Cellular network backbones usually require a line-of-sight (LOS) and a regulated frequency band to ensure high availability throughout the year with no or only little interference. The required availability in such links may reach 99.999% of the year. Frequency bands commonly used are in the range between 7 GHz and 38 GHz.

Since communication is done between two stationary nodes in the network, transmission beams are often generated using dish antennas which provide some gain and reduce interference. In the lower frequency range, for example 4 GHz-15 GHz, long range links are formed. These links occasionally suffer from multipath effects which may cause either flat or dispersive fading phenomena.

A space diversity receiver combines a signal as received by two or more sufficiently spaced apart receive antennas. If a distance between receiving antennas is sufficiently large, it is assumed that multipath effect fading causes uncorrelated fading in the two receiving antennas. In a typical installation a distance between the spaced apart antennas at one side of a wireless link is on the order of 10 meters. Space diversity has proven itself over the years as an effective method to overcome multipath fading.

Additional background art includes:

U.S. Patent Application Publication number 2014/0126664 of Mizrahi et al., titled "Using Sequences for Symbol Timing Synchronization in Single-Carrier MIMO Communication Systems".

H. Matsuda, K. Takeda and F. Adachi, "Downlink Transmit Diversity for Broadband Single-Carrier Distributed Antenna Network", $71^{st}$ IEEE Conference on Vehicular Technology, VTC 2010, Taipei.

The disclosures of all references mentioned above and throughout the present specification, as well as the disclosures of all references mentioned in those references, are hereby incorporated herein by reference.

SUMMARY OF THE INVENTION

Typical space diversity uses spacing between antennas on both sides of a wireless link, but actually it may be enough to space apart antennas on one side of a wireless link for transmission paths to be spaced apart, in both directions. An aspect of some embodiments of the invention relates to space diversity, which optionally includes transmit diversity and/or receive diversity.

In some embodiments methods of pre-coding transmission signals are used to reduce interference when multiple antennas transmit to one receiving antenna.

An aspect of some embodiments of the invention relates to using a single antenna on one side, and two antennas on the other, and achieving space diversity.

An aspect of some embodiments of the invention relates to using one antenna on one side, and two antennas on the other, and achieving transmit diversity on one side and receive diversity on the other side.

An aspect of some embodiments of the invention relates to using two transmitters to transmit from one antenna, to increase signal gain over a wireless link.

An aspect of some embodiments of the invention relates to using two transmitters to transmit from one antenna, to increase signal gain and/or to achieve diversity over a wireless link.

An aspect of some embodiments of the invention relates to using more than one antenna on one side, and more than one antenna on the other, and achieving space diversity.

An aspect of some embodiments of the invention relates to methods of simplified beam forming to improve signal reception quality when practicing transmit diversity from two or more antennas and/or receive diversity at two or more antennas.

According to an aspect of some embodiments of the present invention there is provided a single-carrier-modulation communication system for transmitting data over a wireless link, the communication system including on a first side of a wireless link one single-carrier-modulation receiver associated with a single antenna, on a second side of the wireless link a plurality of antennas and a plurality of single-carrier-modulation transmitters, each one of the plurality of transmitters associated with one of the plurality of antennas, the transmitters each further associated with a pre-coding filter, and the plurality of transmitters are arranged to each transmit same data via a respectively associated pre-coding filter and the associated antenna, using the pre-coding filters to perform beam-forming to the one receiver.

According to some embodiments of the invention, parameters defining at least one of the pre-coding filters are modified according to a method as follows: obtaining impulse response data for each one of a plurality of transmission path sections associated with each one of the plurality of transmitters, wherein the transmission path sections include a pre-coding filter associated with the one of the plurality of transmitters and a wireless link from the one of the plurality of transmitters to a receiver, evaluating a frequency response of a transmission path section which includes the pre-coding filter and the wireless link including summing of all of the transmission path sections, evaluating a frequency response of each one of the pre-coding filters, modifying phases of elements in a frequency response of at least one of the pre-coding filters, and evaluating time domain coefficients of the modified frequency responses of each of the pre-coding filters, and at least one parameter of at least one pre-coding filter is updated based on the evaluating time domain coefficients, thereby performing beam forming of at least one associated transmitter.

According to some embodiments of the invention, each one of the plurality of transmitters includes a pre-coding filter, and parameters defining at least one of the pre-coding filters are updated according to a method as follows: obtaining impulse response parameters for each one of a plurality of transmission path sections associated with each one of the plurality of transmitters, wherein the transmission path sections include a pre-coding filter associated with the one of the plurality of transmitters and a wireless link from the one of the plurality of transmitters to a receiver, evaluating a center of each of the components of a received signal, obtaining a differential delay between a signal of a reference transmitter and each one of a plurality of other signals associated with each one of the plurality of transmitters, evaluating a frequency response of a transmission path which includes the pre-coding filter and the wireless link, obtaining a phase of a line-of-sight component for each of the transmission paths, evaluating a differential phase shift of each one of a plurality of other frequency responses associated with each one of the plurality of transmitters with respect to the frequency response of the reference transmitter, and updating a phase of frequency responses except for the line-of-sight frequency response by subtracting a phase difference from the line-of-sight component, and compensating for the differential phase shift by adding a phase shift of $2\pi f \cdot \tau$, where $\tau$ denotes a differential time delay and $f$ denotes a baseband frequency, to the frequency responses except for the line-of-sight frequency response.

According to some embodiments of the invention, the first side of the wireless link includes a plurality of receivers each one with an associated antenna, and wherein the plurality of transmitters are arranged to each transmit same data via the associated antenna to the plurality of receivers.

According to some embodiments of the invention, one of the plurality of receivers is defined as a reference receiver.

According to some embodiments of the invention, the first side of the wireless link includes two receivers each one with an associated antenna, the plurality of transmitters includes two transmitters arranged to each transmit same data via the associated antenna to the two receivers, the two receivers are arranged to send feedback including data describing the impulse response and a quality measure from each transmitter as received by the two receivers, and the two transmitters are arranged to use the data describing signals received by the two receivers to update parameters of at least one of the pre-coding filters.

According to some embodiments of the invention, each one of the two transmitters is arranged to use the data received from both of the receivers and describing signals received by the two receivers.

According to some embodiments of the invention, the transmitters are arranged to transmit at a fixed transmission power from the associated antennas.

According to some embodiments of the invention, the plurality of transmitters consists of two transmitters, each one with an associated antenna.

According to some embodiments of the invention, the plurality of antennas include a plurality of dish antennas.

According to an aspect of some embodiments of the present invention there is provided a single-carrier-modulation communication system for transmitting data over a wireless link, the communication system including on a first side of a wireless link only one single-carrier-modulation receiver associated with a single antenna, on a second side of the wireless link a plurality of antennas and a plurality of single-carrier-modulation transmitters, each one of the plurality of transmitters associated with an associated one of the plurality of antennas, the transmitters each further associated with a pre-coding filter, and the plurality of transmitters are arranged to each transmit same data via a respectively associated pre-coding filter and the associated antenna to the only one receiver.

According to an aspect of some embodiments of the present invention there is provided a method for beam forming in a single-carrier-modulation communication system, the method including obtaining channel impulse response for each one of a plurality of pre-coder and wireless transmission paths associated with each one of a plurality of single-carrier-modulation transmitters, wherein the transmission paths include a pre-coding filter associated with the one of the plurality of transmitters and a wireless channel from the one of the plurality of transmitters to a single-carrier-modulation receiver, evaluating a frequency response for each one of the plurality of transmission paths, evaluating a frequency response of each one of the pre-coding filters, modifying phases of elements in a frequency response of at least one of the pre-coding filters, thereby updating at least one coefficient of the at least one of the pre-coding filters, and evaluating time domain coefficients of the modified frequency responses of each of the pre-coding filters.

According to some embodiments of the invention, further including selecting one of the plurality of transmitters to be a reference transmitter, and refraining from modifying parameters for the reference transmitter.

According to some embodiments of the invention, further including transmitting from the plurality of transmitters to a plurality of single-carrier-modulation receivers, selecting one of the plurality of receivers to be a reference receiver, and performing the obtaining channel impulse response, the evaluating a frequency response, the evaluating a frequency response, the modifying phases, and the evaluating time domain coefficients based on a received signal at the reference receiver.

According to some embodiments of the invention, the obtaining channel impulse response for each one of the plurality of transmission path sections associated with each one of the plurality of transmitters includes calculating a series of correlations between a preamble signal associated with the transmitter and a symbol sequence in the receiver at a plurality of relative lags.

According to some embodiments of the invention, the evaluating a frequency response of a combined transmission path includes performing a Fourier Transform on the impulse responses.

According to some embodiments of the invention, the evaluating a frequency response of each one of the pre-coding filters includes performing a Fourier transform of coefficients of each one of the pre-coding filters.

According to some embodiments of the invention, the modifying phases includes converting the pre-coding filters to a frequency domain and modifying the phase, based on a difference between a phase of a received signal from a reference transmission unit and a phase of a received signal from a transmission unit associated with the pre-coding filter.

According to some embodiments of the invention, transmitted power from each one of the plurality of single-carrier-modulation transmitters remains unchanged.

According to an aspect of some embodiments of the present invention there is provided a method for beam forming in a single-carrier-modulation communication system, the method including obtaining impulse response data for each one of a plurality of transmission path sections associated with each one of a plurality of single-carrier-modulation transmitters, wherein the transmission path sections include a pre-coding filter associated with the one of the plurality of transmitters and a wireless link from the one of the plurality of transmitters to a receiver, evaluating a center of each one of the impulse responses of a received signal, obtaining differential delay between a signal of a reference transmitter and each one of a plurality of other signals associated with each one of the plurality of transmitters, evaluating a frequency response of a combined channel of each one of the plurality of other signals, obtaining an average phase of a line-of-sight component for each of the combined channels, evaluating a differential phase of each one of the plurality of other signals associated with each one of the plurality of transmitters with respect to the signal of the reference transmitter, and modifying a phase of frequency responses except for the line-of-sight frequency response by subtracting a phase difference from the line-of-sight component, and compensating for the differential phase shift by adding a phase shift of $2\pi f\tau$, where $\tau$ denotes a differential time delay and f denotes a baseband frequency, to the frequency responses except for the line-of-sight frequency response, converting the modified frequency responses to time domain responses by performing an Inverse Fourier Transform (IFFT), and using at least one of the time domain responses as a coefficient of at least one of the pre-coding filters, thereby updating at least one coefficient of the at least one pre-coding filter associated with a plurality of single-carrier-modulation transmitters.

According to some embodiments of the invention, further including transmitting from the plurality of transmitters to a plurality of single-carrier-modulation receivers, selecting one of the plurality of receivers to be a reference receiver, and performing the method of claim 20 based on a received signal at the reference receiver.

According to some embodiments of the invention, further including selecting one of the plurality of transmitters to be a reference transmitter, and refraining from updating the pre-coding filter associated with the reference transmitter.

According to some embodiments of the invention, the evaluating a center of each of the components of a received signal includes calculating $TED_i = \Sigma_{k=-N \text{ to } N} k \cdot |c_i[k]|^2 / \Sigma_k = -N \text{ to } N |c_i[k]|^2$ where k is an index of an individual impulse response, and $c_i$ is a component of an $i^{th}$ received signal from an $i^{th}$ transmitter.

According to some embodiments of the invention, the obtaining a differential delay between a signal of a reference transmitter and each one of a plurality of other signals associated with each one of the plurality of transmitters includes calculating $\Delta t_i = TED_{ref} - TED_i$.

According to some embodiments of the invention, the evaluating a frequency response of a combined channel includes calculating a Fourier transform of an impulse response of the combined channel.

According to some embodiments of the invention, the updating the pre-coding filters includes calculating an inverse Fourier transform of updated frequency responses.

According to some embodiments of the invention, transmitted power from each one of the plurality of single-carrier-modulation transmitters remains unchanged.

According to an aspect of some embodiments of the present invention there is provided a single-carrier-modulation communication system for transmitting data over a wireless link, the communication system including: on a first side of a wireless link only one single-carrier-modulation receiver associated with an associated antenna, and a plurality of single-carrier-modulation transmitters associated with the associated single antenna, on a second side of the wireless link a plurality of antennas, a plurality of single-carrier-modulation receivers, and a plurality of single-carrier-modulation transmitters, each one of the plurality of transmitters associated with an associated one of the plurality of antennas, the transmitters each further associated with a pre-coding filter, and the plurality of transmitters on the first side are arranged to each transmit same data via a respectively associated pre-coding filter and the associated antenna to the plurality of receivers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to methods and systems for transmitting data over a single carrier wireless link, and even more particularly, but not exclusively, to transmitting data over a single carrier wireless link using transmit diversity and/or receive diversity and achieving a form of space diversity.

A common practice to overcome temporary fading phenomena is based on receiver space diversity.

A space diversity receiver combines a signal as received by two or more sufficiently spaced apart receiving antennas. If a distance between the receiving antennas is sufficiently large, it is assumed that multipath effect fading causes uncorrelated fading in the two receiving antennas. In a typical installation a distance between the antennas at one and/or both sides of a wireless link is on the order of 10 meters.

Figure 1:
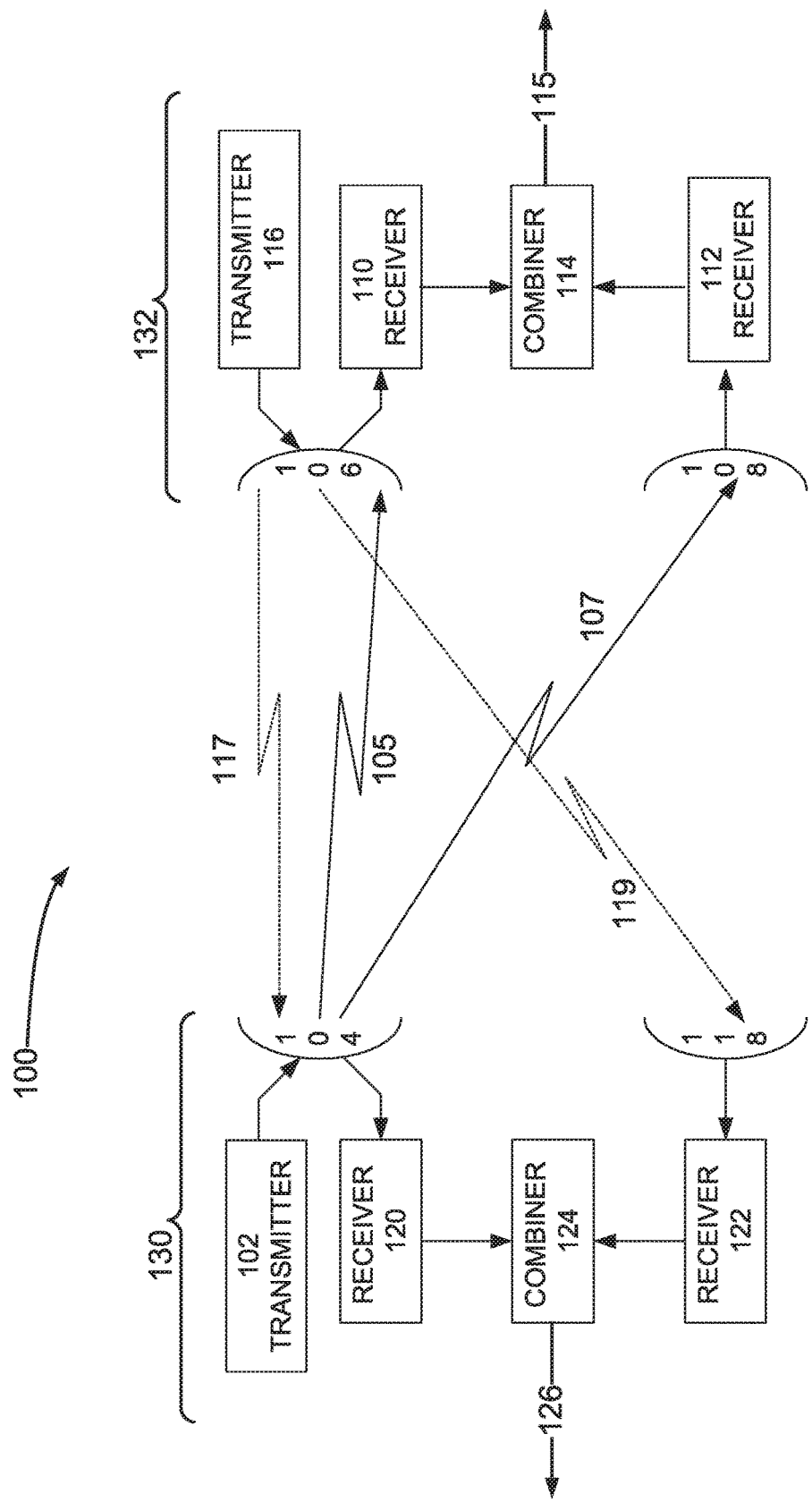
FIG. 1 is a simplified illustration of a prior art wireless link using space diversity.

For purposes of better understanding some embodiments of the present invention, reference is first made to FIG. 1, which is a simplified illustration of a prior art wireless link 100 using space diversity.

FIG. 1 depicts a first transmitter 102 transmitting from a first side 130 of the wireless link 100, via a first dish antenna 104, over a wireless link 100 to a second side 132 of the wireless link 100, to two dish antennas 106 108, to two receivers 110 112. FIG. 1 depicts two space diversified paths 105 107 from the first dish antenna 104 to the two dish antennas 106 108.

The signal received by the two dish antennas 106 108 is combined by a combiner 114, potentially forming a stronger cleaner signal 115 than either one of the signals received by the two dish antennas 106 108.

FIG. 1 also depicts a second transmitter 116 transmitting via a first one 106 of the two antennas 106 108 over the wireless link 100 to two antennas 104 118 to two receivers 120 122. FIG. 1 also depicts two space diversified paths 117 119 from the antenna 106 to the two antennas 104 118.

The signal received by the two antennas 104 118 is combined by a combiner 124, potentially forming a stronger cleaner signal 126 than either one of the signals received by the two antennas 104 118.

FIG. 1 depicts a situation where two antennas spaced somewhat apart act to receive two signals transmitted from a single transmitter and transmitted over two different paths. Since the paths between the transmitter and the two antennas are different, they provide space diversity, and therefore, a signal transmitted over one of the paths might be attenuated and degraded while the signal transmitted over the other path might not.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Space diversity has proven itself over the years as an effective method to overcome multipath fading.

A drawback of prior art space diversity systems is their cost. In such systems there is a need to install a total of four antenna dishes and four receivers for communicating bi-directionally over a single channel. If it is desired to grow the space diversity order by employing three antennas at each side of the bi-directional link the total cost involves 6 antenna dishes and 6 receivers.

An aspect of some embodiments of the invention relates to using only one antenna on one side, and two antennas on the other, and achieving space diversity. It is to be appreciated that once two antennas are space separated on one side of a wireless link, the two wireless paths from a single antenna on one side of the wireless link and the two antennas on another side of the wireless link are already space diversified, in both directions, and can produce a beneficial effect of space diversity.

It is noted here that in some embodiments a dish antenna may be mentioned, however, wherever antennas are mentioned herein, in the specification and in the claims, both dish antennas and other types of antennas, not only dish antennas, are to be understood.

In some embodiments of the invention, two signals transmitted from the two antennas toward the one antenna are synchronized and/or modified so as to produce a constructive combined received signal at the one antenna, to reduce potential interference between the two signals.

An aspect of some embodiments of the invention relates to using two transmitters to transmit from one antenna, to increase signal gain over a wireless link between antennas.

An aspect of some embodiments of the invention relates to methods of modifying transmission signals when transmitting over a space diversity wireless link.

An aspect of some embodiments of the invention relates to methods of modifying transmission signals when transmitting over a space diversity wireless link by using a simplified version of beam forming.

An example prior art concept of beam-forming is used with OFDM (Orthogonal Frequency Division Multiplexing) in cellular communication between a base station and mobile user equipment (UE), such as a cellular phone, for example. The concept of beam-forming provides space diversity for overcoming multipath fading effects by transmitting signals from several antennas, at a cost of calculating and producing signal phase differences and power levels for each one of the transmitting antennas to effectively form a beam directed at the UE. OFDM lends itself naturally to beam forming since OFDM routinely requires setting a signal phase and a signal gain at a discrete set of frequencies. Calculation of signal phase and gain is done naturally in the frequency domain for each frequency, as if signal fading is flat. However, OFDM forming is not applicable to single carrier modulations such as used in cellular backhaul communication systems.

On the other hand, cellular backhaul systems employ single carrier modulations. Single carrier modulations have some appealing properties such as a reduced PAPR (peak to average power ratio), a reduced sensitivity to phase noise, and a higher spectral efficiency in comparison to OFDM systems, since dense pilot tones and frequent cyclic prefix sequences are not required.

Relative to OFDM systems, which use narrow sharply defined frequency bands, and are able to set a specific signal phase and a specific signal gain at the narrow, sharply defined frequency, the bandwidth of single carrier modulation systems is much broader. The broader bandwidth means that signal phase and signal gain are not constant over the frequency band. A phase change in one portion of the single carrier modulation bandwidth is different in another portion of the single carrier modulation bandwidth.

However, in some embodiments, updating one or more pre-coding coefficients acting on a signal to be transmitted, not per frequency, but on the entire signal, an effect similar to beam-forming can be achieved for single carrier modulation systems.

Beam-forming for single carrier systems, especially over dispersive fading channels, if it were performed similarly to the way OFDM systems do beam forming, would be more complicated than for OFDM. One reason for the complication is that processing in most single carrier systems is typically done in the time domain. Employing beam-forming for cellular backhaul systems is presently avoided due to its complexity.

An aspect of some embodiments of the invention relates to single carrier modulation systems which combine space diversity and beam forming for single carrier modulations in a way which enables reducing a number of required receive antennas and/or receivers in a link.

In some embodiments, a beam forming method is used for single carrier modulations with possible dispersive fading.

In some embodiments, even when a number of receive antennas and receivers remain unchanged relative to prior art space diversity (SD) systems, applying the beam forming method potentially enables improving system gain by 6 dB for an SD system which includes two transmitters, and by 8-9 dB over prior art single input single output (SISO) systems, potentially at least doubling an effective distance spanned by a wireless link.

The term "receive antenna" is used throughout the present specification and claims for an antenna connected to a receiver, to distinguish from the term "antenna" which is used for an antenna which may transmit and receive a signal simultaneously.

The term "transmit antenna" is used throughout the present specification and claims for an antenna connected to a transmitter, to distinguish from the term "antenna" which is used for an antenna which may transmit and receive a signal simultaneously.

It is noted that typically a receiving antenna is also a transmitting antenna. In practice there is typically one antenna connected to a system in one side of a wireless link. The distinction between "transmit antenna" and "receive antenna" is used to help explain embodiments of the disclosure.

Space Diversity without Using Paired Antennas

Figure 2A:
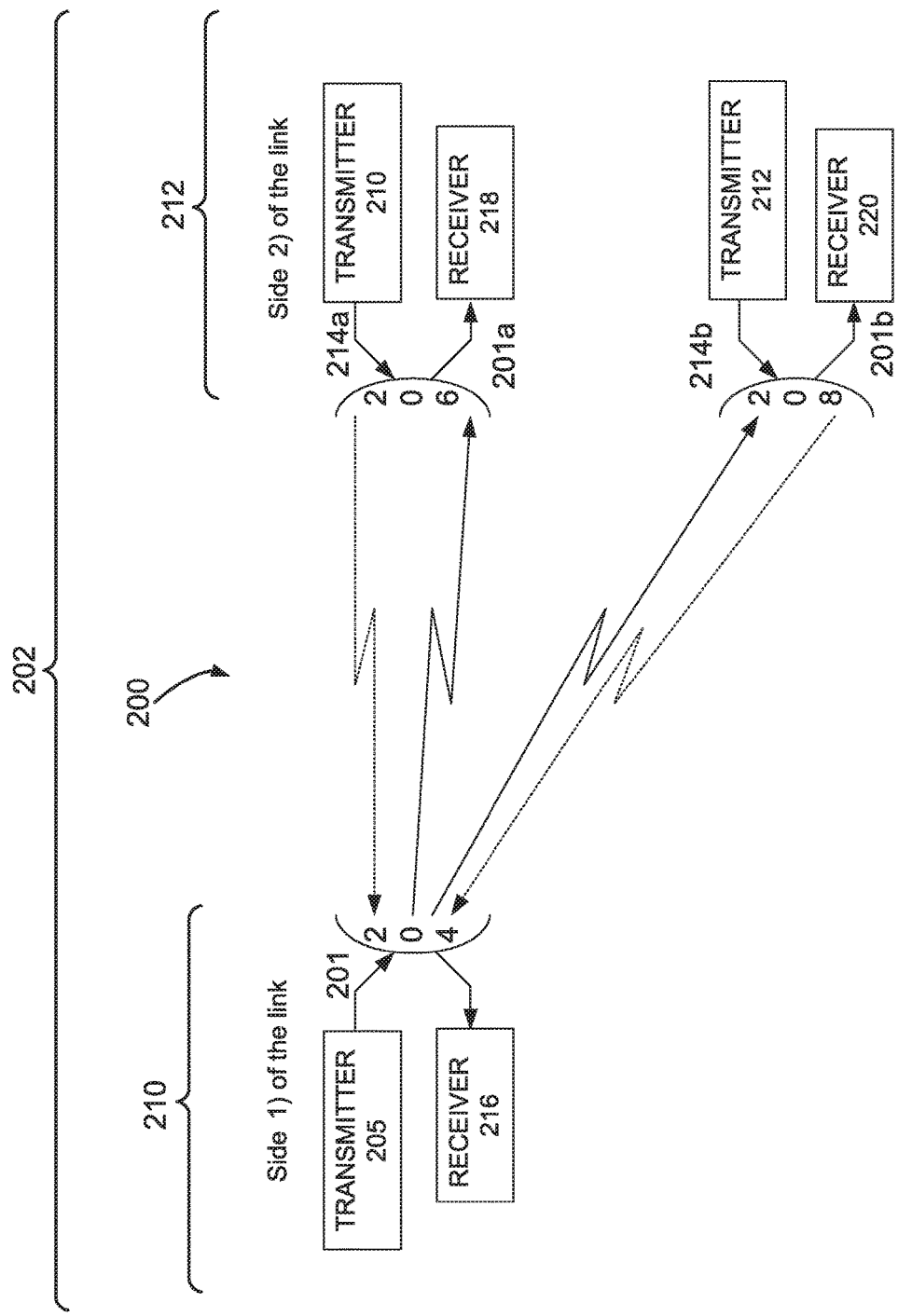
FIG. 2A is a simplified illustration of a wireless link using space diversity according to an example embodiment of the invention.

Reference is now made to FIG. 2A, which is a simplified illustration of a wireless link 200 using space diversity according to an example embodiment of the invention.

FIG. 2A demonstrates a wireless communication system 202 with three antennas 204 206 208 which overcomes multipath phenomena in both directions, from a first side 210 to a second side 212, and from the second side 212 to the first side 210.

In one direction of the wireless link 200, from the first side 210 to the second side 212, the system 202 optionally uses signal combining or signal selection. In the other direction, from the second side 220 to the first side 210, the system 202 optionally using transmit beam forming.

A signal 201 transmitted by a first transmitter from the first side 210 of the wireless link 200 via a first antenna 204 is received at the second side 212 by two separated antennas 206 208 and two receivers 218 220. The received signals 201a 201b are combined by a combiner (not shown) as in space-diversity combining.

Two transmitters 210 212 on the second side 212 of the wireless link 200 transmit signals 214a 214b which are matched in phase in such a way which enables the signals 214a 214b to be combined constructively at a receiver 216 on the first side 210 of the wireless link 200. A method for producing the signals 214a 214b to be transmitted on a possibly dispersive channel with a single-carrier modulation is further detailed below.

FIG. 2A demonstrates an asymmetric situation with respect to transmitted power. The signals from the second side 212 of the wireless link 200 are transmitted with double power relative to the signal 201 from the first side 210 of the wireless link 200, since two transmitting devices are involved. This favors the link from the second side 212 to the first side 210 with respect to system gain.

Figure 2B:
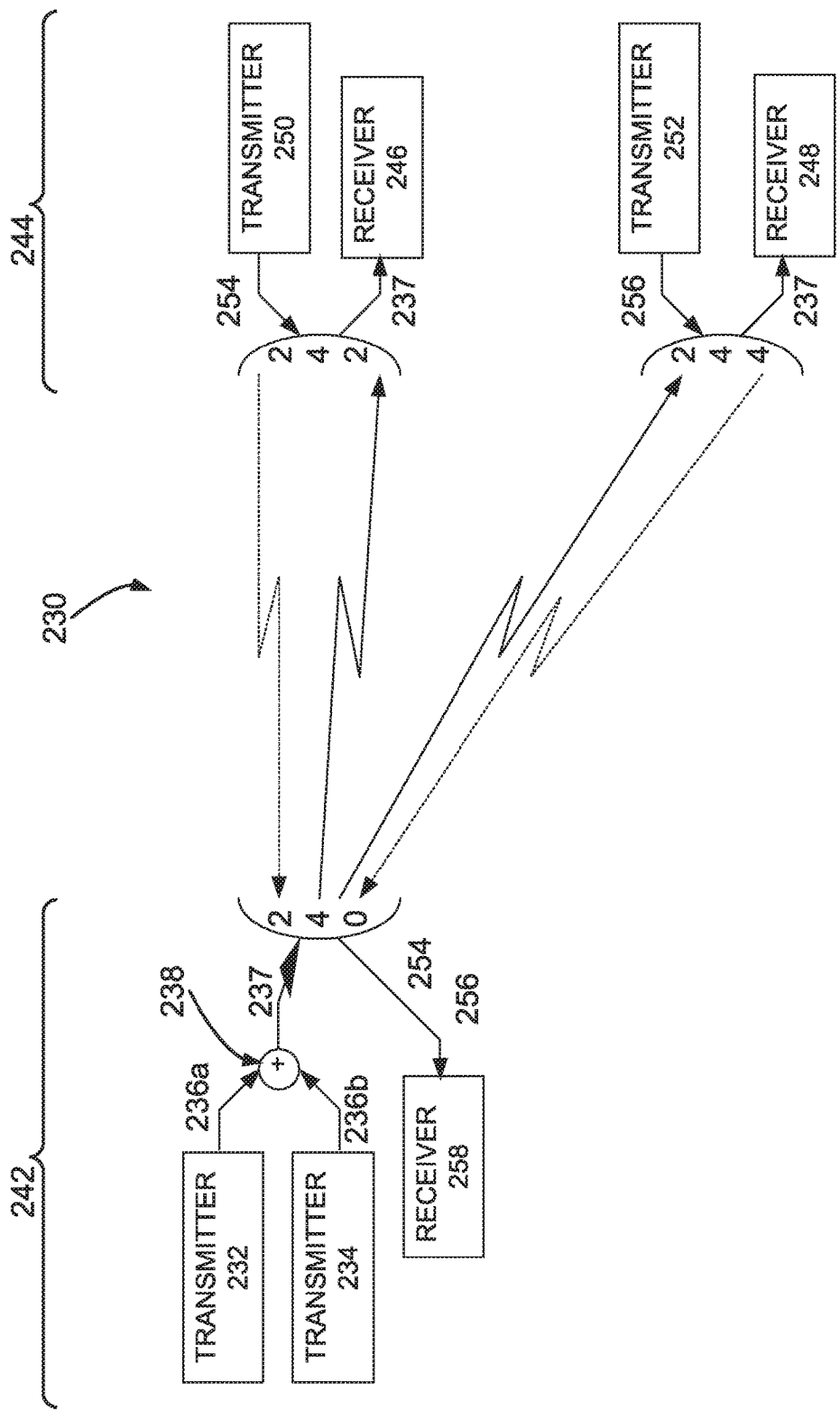
FIG. 2B is a simplified illustration of a wireless link using space diversity according to an example embodiment of the invention.

In some embodiments, the configuration is optionally made symmetric with respect to transmitted power, as shown in FIG. 2B. The symmetric configuration described in FIG. 2B potentially provides a 6 dB increase in system gain over a SISO system, in addition to providing space diversity.

Reference is now made to FIG. 2B, which is a simplified illustration of a wireless link 230 using space diversity according to an example embodiment of the invention.

FIG. 2B depicts a configuration with symmetric system gain.

Two transmitters 232 234 produce two signals 236a 236b, which are combined by an adder 238 to produce a combined transmission signal 237, which is transmitted from an antenna 240 from a first side 242 of the wireless link 230, and received at the second side 244 by two separated antennas 242 244 and two receivers 246 248.

Two transmitters 250 252 on the second side 244 of the wireless link 230 transmit signals 254 256 to a receiver 258 on the first side 242 of the wireless link 230.

Beam Forming

With reference to beam forming, two non-limiting types of example embodiments have already been described above.

A first type of an example embodiment is depicted in FIGS. 2A and 2B, in which multiple transmitters produce a beam directed at a single receiving antenna.

Figure 3:
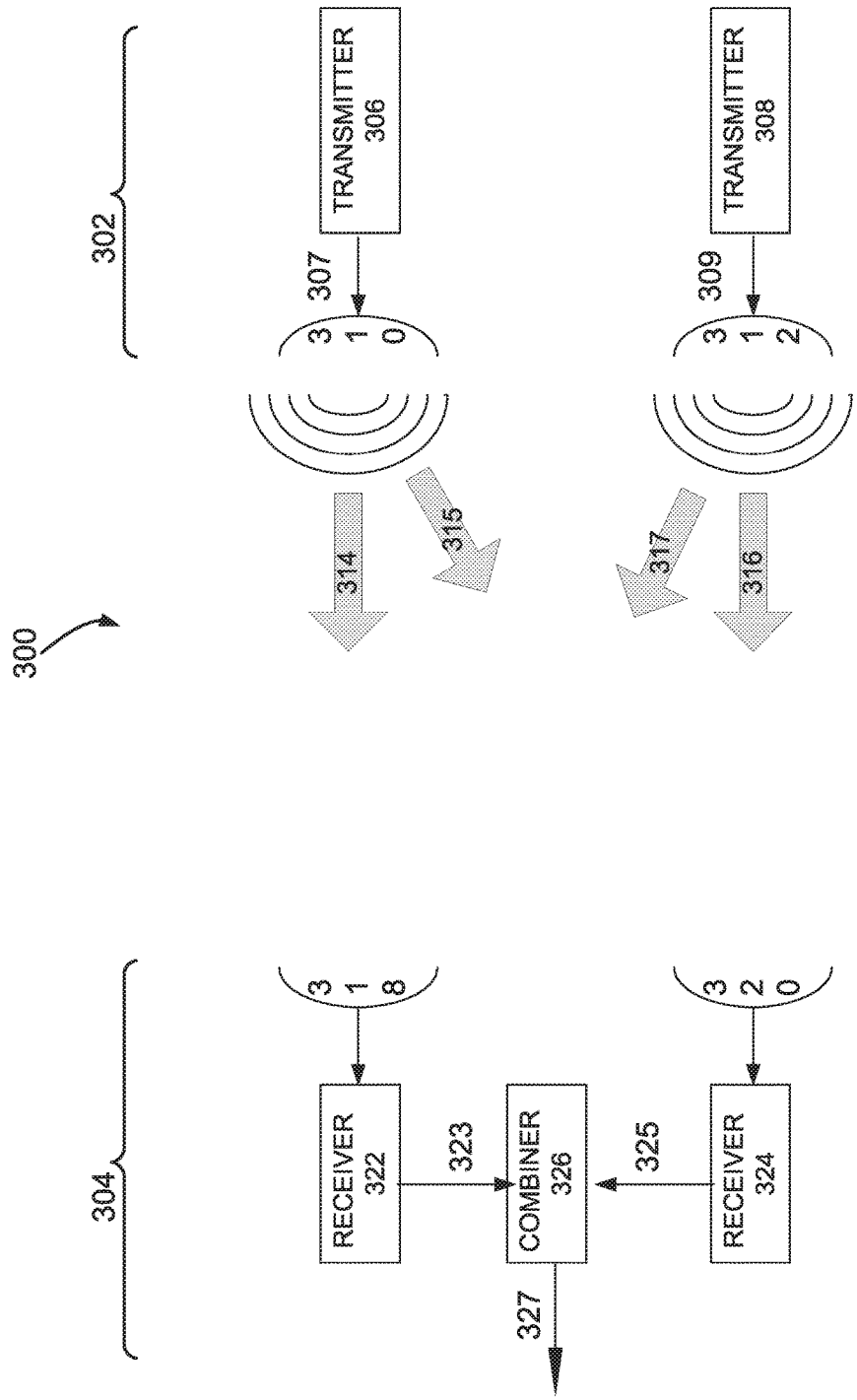
FIG. 3 is a simplified illustration of a wireless link using space diversity and beam forming according to an example embodiment of the invention.

A second type of example embodiment is depicted in FIG. 3 which is described below. In FIG. 3 there are multiple receiving antennas for a signal generated by multiple transmitting antennas. Use of multiple receivers with multiple antennas provides both an increased system gain and an increase in a degree of space diversity.

Reference is now made to FIG. 3, which is a simplified illustration of a wireless link 300 using space diversity and beam forming according to an example embodiment of the invention.

Two transmitters 306 308 produce two signals 307 309, which are transmitted from two antennas 310 312 from a first side 302 of the wireless link 300, and received at a second side 304 of the wireless link 300 by two separated antennas 318 320 and two receivers 322 324. Two signals 323 325 received by the two receivers 322 324 are combined by a combiner 326, producing a combined signal 327.

For clearness sake, only one direction of transmission via the wireless link 300 is depicted in FIG. 3, but in example embodiments a symmetric arrangement of transmitters, receivers, and combiners using the same antennas operate in a reverse direction over the wireless link 300, as can be understood by a person skilled in the art.

In many implementations a maximal power level which can be transmitted from each transmitter is legally required. Typically, less than the maximum power is usually not used.

In some embodiments, several transmitting antennas are optionally arranged in a row, the power transmitted from the antennas is optionally gradually reduced towards an edge of the antenna array. Such distribution of power has an effect of modifying beam pattern and reducing side lobes, which is similar to beam-forming, and is termed herein beam forming.

Beam forming is described in further detail below, starting with a section titled: "Beam-Forming for a General Dispersive Channel with a Single Receiving Antenna", where beam forming is described with reference to coefficients of pre-coding filters.

In example embodiments of the invention, a beam forming method includes one or more of the following features:

beam forming for single carrier modulation over a possibly dispersive channel;

transmitted power from each transmitter should remain approximately unchanged as a transmitted beam changes or shifts direction. It is noted that the above is typically a legal constraint imposed when allocating frequencies to single carrier modulation systems;

a beam forming unit is updated via feedback from one receiver which is defined as a master, or reference, receiver. Such a feature simplifies an updating method of the beam forming by avoiding a need that the receivers necessarily communicate with each other;

the beam forming method is robust and supports more than two transmitters and more than one receiver with no significant change to the method; and the beam forming method provides close to optimal performance in terms of SNR of a combined signal from all receiving elements.

The five features mentioned above constitute differences between prior art methods and example embodiments of the invention.

Examples of prior art beam forming methods deployed in cellular networks have the following features:

beam forming for multi-carrier-frequency (or multi-tone) modulation, where a channel for each tone or frequency is inherently flat, and each tone has its own beam-former;

a constraint on total transmitted power rather than on a transmitted power from each antenna. In OFDM systems there is not a constraint on power transmitted from a particular antenna, since the antenna potentially serves a changing number of mobile stations at any given moment, but there may be a constraint on total power transmitted; and complexity of the algorithm grows as the number of receiving antennas increases.

A channel model used in describing example embodiments is typical of wireless cellular backhaul systems. The model includes a selected component also termed herein a line-of-sight component. In some embodiments the selected component is a component with a highest amplitude and/or signal energy. Generally, a channel from a transmitting antenna to a receiving antenna is optionally expressed as a filter with a sampled impulse response $h_{i,j}[n]$, where i represents a receiver index and j represents a transmitter index. An additive Gaussian noise process is optionally also present at receiver inputs. A noise process of receiver i is denoted by $n_i[n]$.

Figure 4:
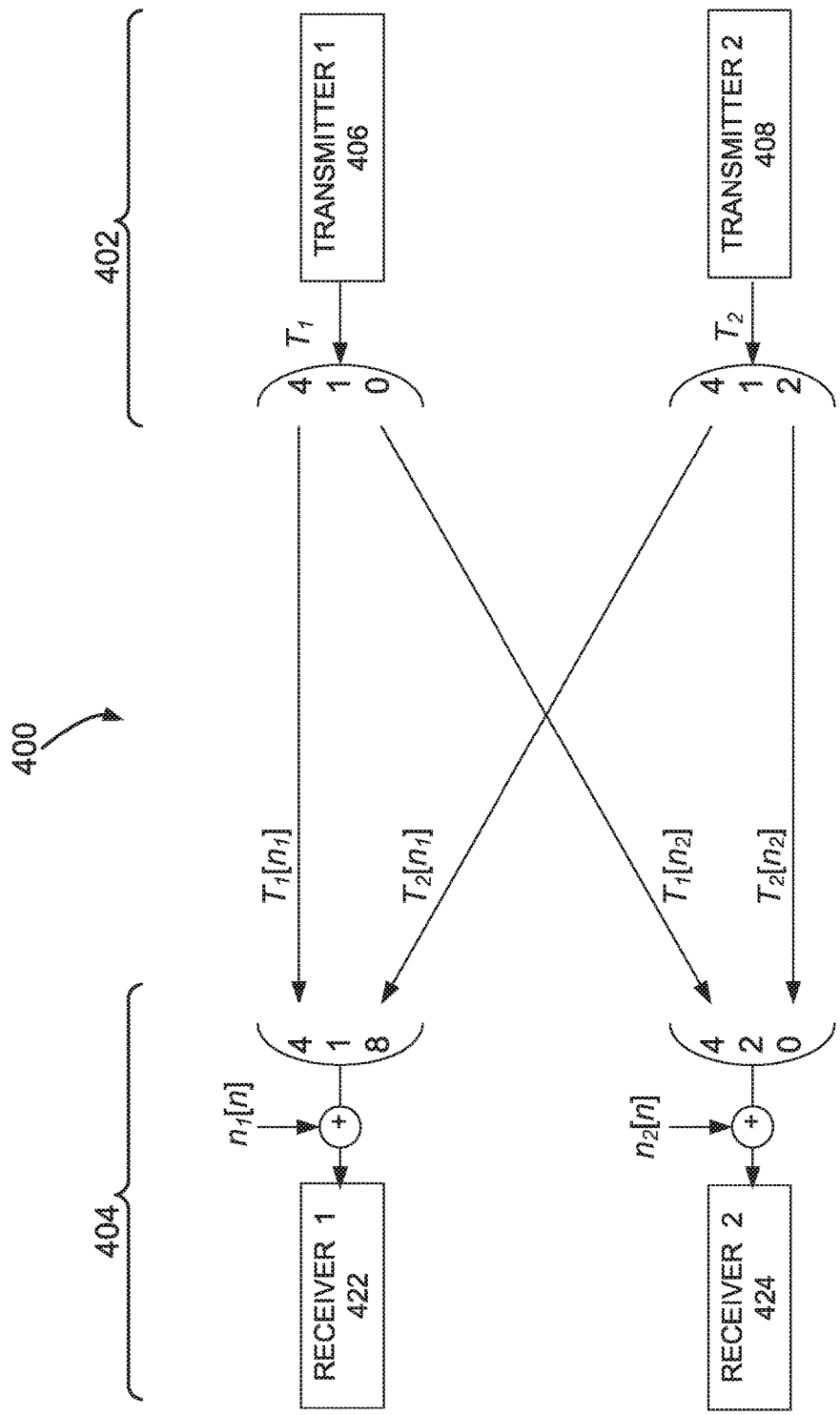
FIG. 4 is a simplified illustration of a model for channel impulse response for transmitting over a wireless link according to an example embodiment of the invention.

Reference is now made to FIG. 4, which is a simplified illustration of a model for channel impulse response for transmitting over a wireless link 400 according to an example embodiment of the invention.

Two transmitters 406 408 produce two signals $T_1$ $T_2$, which are transmitted from two antennas 410 412 from a first side 402 of the wireless link 400, and received at a second side 404 of the wireless link 400 by two separated antennas 418 420 and two receivers 422 424.

An example embodiment method is now described for beam forming for general channels, and further below an example embodiment simplified method is described for a dominant line-of-sight model.

Beam-Forming for a General Dispersive Channel with a Single Receiving Antenna

In an example embodiment methods for beam forming one or more of the following conditions are preferably included:

Transmitting elements are optionally synchronized in terms of symbol clock rate and carrier phase. This condition provides different transmitted signals which don't drift in time or in phase relative to each other. Synchronization is optionally obtained either physically by sharing a clock signal or a carrier source, or by mechanisms which compensate for the lack of a physical connection.

Existence of a feedback channel by which a receiver optionally informs a transmitting element(s) about a quality of beam-forming or optionally provides parameters, such as, by way of an example, channel estimation, which assists steering a beam in the right direction. The parameters optionally include, by way of some non-limiting examples, one or more of: impulse response parameters of the two channels; differential time delay between the received signals; differential phase between the received signals or weighted average differential phase between the received signals; and differential phase of each received frequency sub-band between the received signals.

Existence of a pre-coding filter, which may even optionally be a single element which optionally controls phase and/or optionally controls gain of a signal passing through the pre-coding filter, which in general may have a non-flat frequency response. The pre-coding filter optionally modifies at least one of the transmitted signals in a way which optimizes the beam forming. In some embodiments the pre-coding filter is implemented as an IIR or a FIR filter.

The data transmitted by the transmitting elements is identical, except for an optionally different sequence of symbols (preamble symbols) inserted periodically into the data stream as described below with reference to FIG. 5A. The preamble symbols are optionally unique to each transmitting element and are optionally received by the receiver during overlapping periods of time.

Synchronizing Transmissions Between Several Transmitters

Figure 5A:
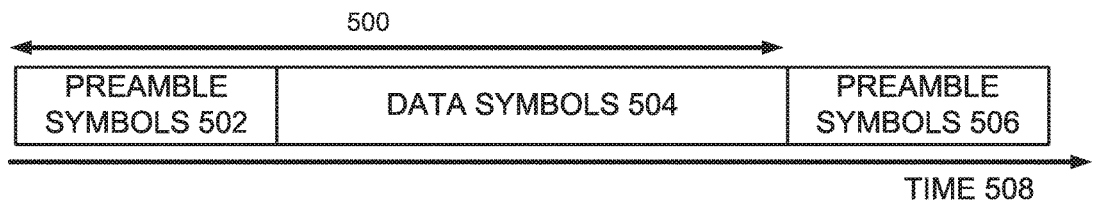
FIG. 5A is a simplified illustration of a transmission frame according to an example embodiment of the invention.

Reference is now made to FIG. 5A, which is a simplified illustration of a transmission frame 500 according to an example embodiment of the invention.

FIG. 5A depicts a transmission sequence which includes a transmission frame 500 and a portion of a following transmission frame. The transmission frame 500 includes a first portion with preamble symbols 502, and a second portion with data symbols 504. FIG. 5A depicts a first portion of the following frame with preamble symbols 506.

A time axis 508 is also depicted in FIG. 5A.

In some embodiments the preamble sequences are selected as described in above-mentioned U.S. Patent Application Publication number 2014/0126664 of Mizrahi et al., titled "Using Sequences for Symbol Timing Synchronization in Single-Carrier MIMO Communication Systems".

Figure 5B:
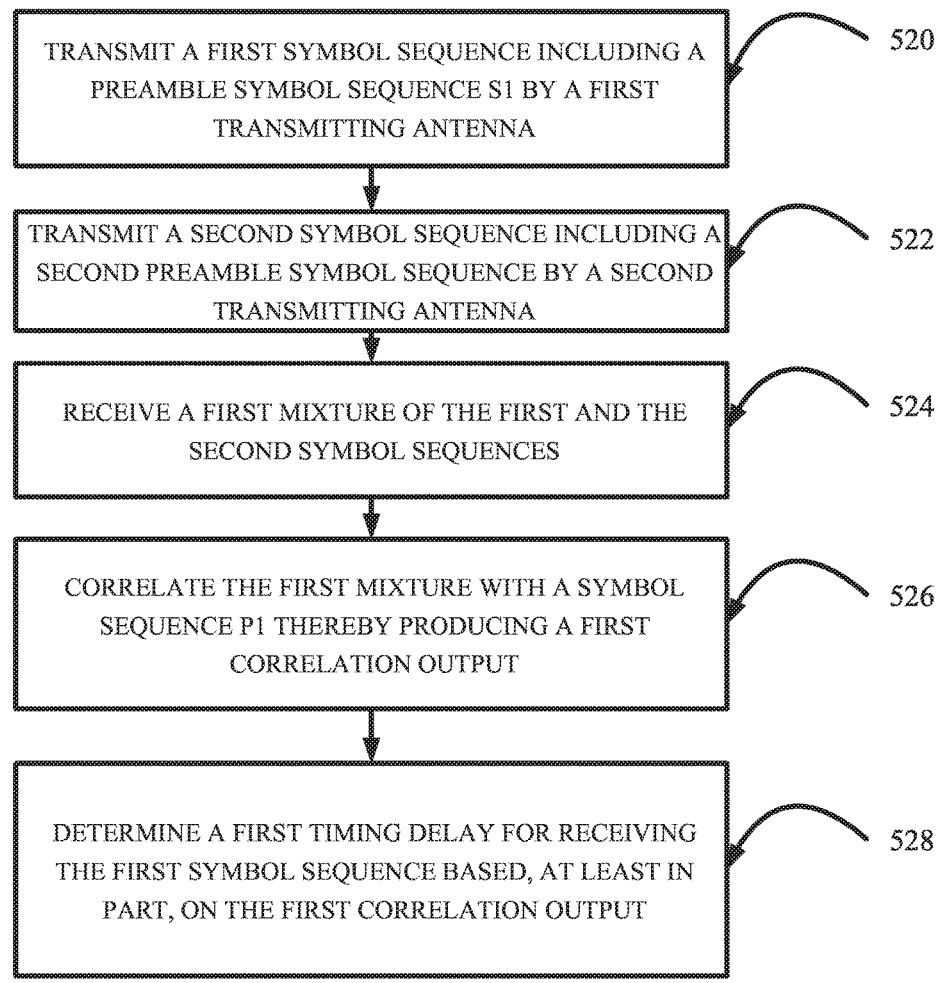
FIG. 5B is a simplified flow chart illustration of a method for evaluating timing delay in a single-carrier modulation communication system according to an example embodiment of the invention.

Reference is now made to FIG. 5B, which is a simplified flow chart illustration of a method for evaluating timing delay in a single-carrier modulation communication system according to an example embodiment of the invention.

The method of FIG. 5B includes:

a transmitting unit transmitting a first symbol sequence including a preamble symbol sequence S1 by a first transmitting antenna (520);

a second transmitting unit transmitting a second symbol sequence including a preamble symbol sequence S2 by a second transmitting antenna (522);

an antenna in a receiving unit receiving a first mixture of the first and the second symbol sequences (524);

the receiving unit correlating the first mixture with a symbol sequence P1 thereby producing a first correlation output (526);

the receiving unit determining a first timing delay for receiving the first symbol sequence based, at least in part, on the first correlation output (528).

In some embodiments the above-mentioned method further comprises:

a second antenna in a second receiving unit receiving a second mixture of the first and the second symbol sequences;

the second receiving unit correlating the second mixture to a symbol sequence P2 thereby producing a second correlation output; and the second receiving unit determining a second timing offset for receiving the second symbol sequence based, at least in part, on the second correlation output.

For simplifying the description below, two transmitting elements are used for example; however, the method can be generalized to more than two transmitting elements. As taught in the above-mentioned reference, two preamble sequences 51 and S2 can optionally be selected such that they are correlated with corresponding sequences P1 and P2 in a receiver in such a way that one correlation results in a sequence of zeros for a range of consecutive lags, and another correlation results in a sequence of consecutive zeros except for a single lag within the sequence. Such a situation is depicted in FIGS. 6A and 6B.

Figure 6A:
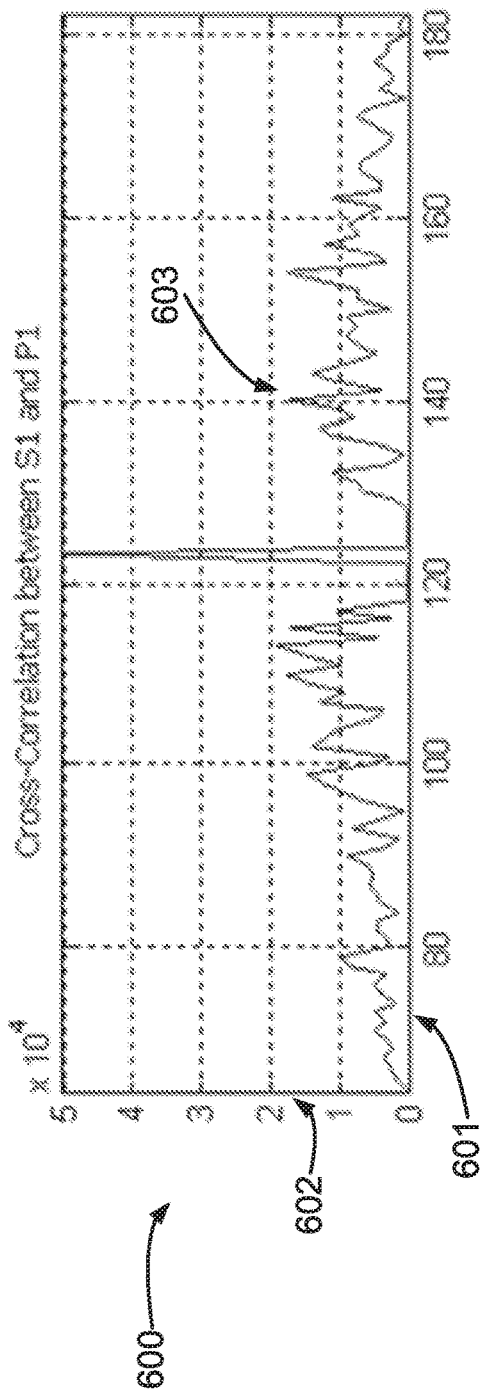
FIG. 6A is a graph of a cross-correlation between a preamble symbol sequence S1 and a corresponding symbol sequence P1 according to an example embodiment of the invention.
Figure 6B:
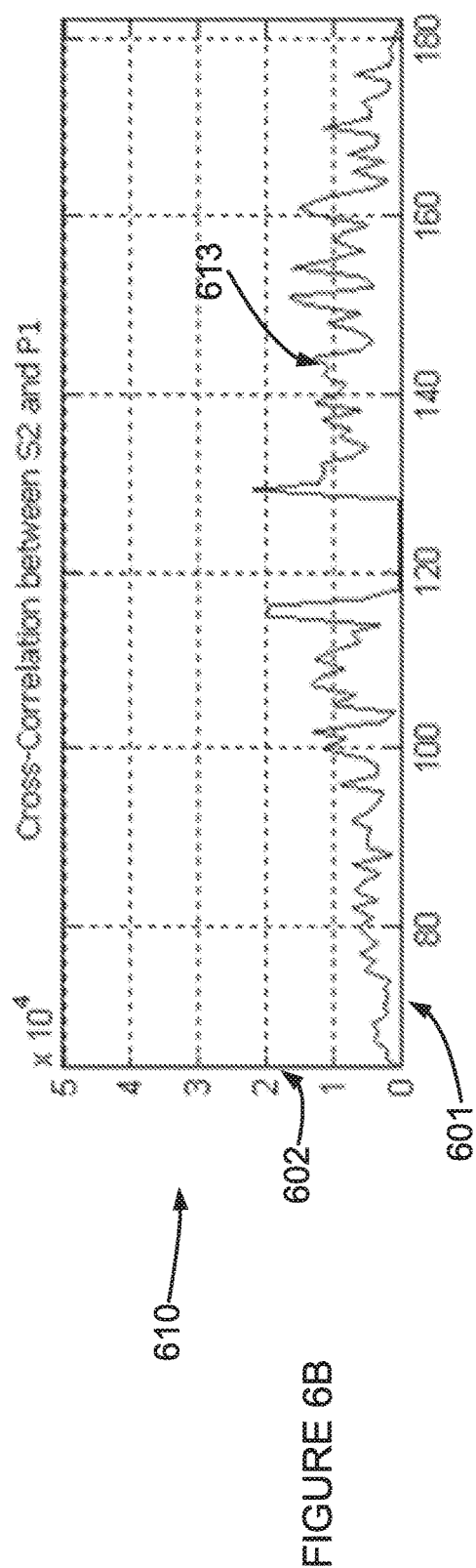
FIG. 6B is a graph of a cross correlation between a preamble symbol sequence S2 and a symbol sequence P1 according to an example embodiment of the invention.

Reference is now made to FIG. 6A, which is a graph 600 of a cross-correlation between a preamble symbol sequence S1 and a corresponding symbol sequence P1 according to an example embodiment of the invention.

The graph 600 has an X-axis 601 depicting time, and a Y-axis 602 depicting magnitude of correlation values.

A line 603 depicts the cross-correlation between S1 and P1.

The correlation values are discrete in time, and the line 603 depicted in FIG. 6A is a line which passes approximately through the symbol values.

Reference is now made to FIG. 6B, which is a graph 610 of a cross correlation between a preamble symbol sequence S2 and a symbol sequence P1 according to an example embodiment of the invention.

The graph 610 has an X-axis 601 depicting time, and a Y-axis 602 depicting magnitude of symbol values.

A line 613 depicts the cross-correlation between S2 and P1.

The correlation values are discrete, and the line 613 depicted in FIG. 6B is a line which passes approximately through the symbol values.

There are potentially an infinite number of such sequences. Moreover, for any given set of sufficiently different preamble sequences S1 and S2 it is typically possible to find sequences P1 and P2 that comply with these requirements. Moreover, the principle taught herein is extendable to more sequences. For example, for embodiments which include three different sequences S1, S2, and S3, it is possible to find three sequences, P1, P2 and P3 for which the cross-correlation between Si and Pi has a delta-function section, and the cross-correlation between Si and Pj, where i and j are different, has an approximately zero-valued section.

In practice, the term zero is optionally interpreted as any magnitude sufficiently close to zero relative to the magnitude of a maximum of the delta function.

The graphs in FIGS. 6A and 6B demonstrate that it is possible to estimate an impulse response of a channel between a transmitter transmitting a preamble sequence S1 and a receiver which performs a correlation with P1, while eliminating interference from a sequence S2. Similarly, (not shown in a figure) we may estimate an impulse response between a transmitter transmitting S2 and the receiver.

Figure 7:
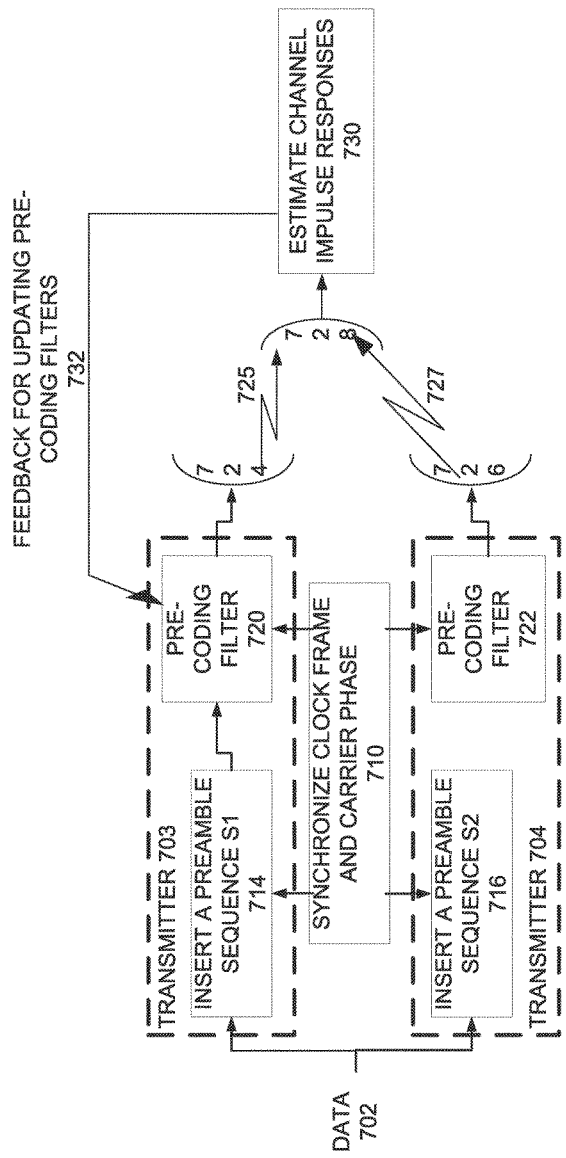
FIG. 7 is a simplified block diagram illustration of beam forming elements in a system using two transmit antennas according to an example of the invention.

Reference is now made to FIG. 7, which is a simplified block diagram illustration of beam forming elements in a system using two transmit antennas according to an example of the invention.

FIG. 7 depicts same data 702 being input to two transmitters 703 704. The data has preamble sequences added 714 716, optionally as described above, and is optionally passed through pre-coding filters 720 722 and transmitted via two antennas 724 726 via two transmission channels 725 727 over a wireless link to a receive antenna 728.

Optionally, the two transmitters share clock and/or carrier phase synchronization signals 710.

Optionally, the two transmitters receive clock and/or frame and/or carrier phase synchronization signals 710.

Optionally the two transmitters synchronize transmission frames.

A receiver (not shown) optionally estimates channel impulse responses 730, and optionally produces feedback parameters 732 for updating the pre-coding filters 720 722, and optionally transmits the feedback data 732 to one or more of the transmitters 703 704. The feedback data optionally includes, by way of some non-limiting examples, one or more of: impulse response data of the two channels; differential time delay between the received signals; weighted average differential phase between the received signals; and differential phase of each received frequency sub-band between the received signals.

In some embodiments, one or more of the pre-coding filters are FIR filters.

In some embodiments the impulse responses between the transmitting elements and the receiver are obtained, and is used for beam forming. In some embodiments, the impulse responses are obtained using the transmitted and received preamble sequence as described above.

It is noted that in some embodiments there are more than two transmitting antennas and more than two transmission channels, however an extension of the methods described herein is straightforward for a person skilled in the art.

The description below uses two received signals which have been transmitted through two transmission channels, and are to be combined in a constructive manner.

Two example methods for updating coefficients of the pre-coding filter or filters so as to achieve beam forming and enable combining the two received signals in a constructive manner are now described.

It is noted that the term "coefficient of a pre-coding filter" in all its grammatical forms is used throughout the present specification and claims interchangeably with the term "parameter of a pre-coding filter" and its corresponding grammatical forms.

In a first example method for updating coefficients of the pre-coding filter, a general dispersive channel is assumed, which does not necessarily have a strong line-of-sight component.

Figure 8A:
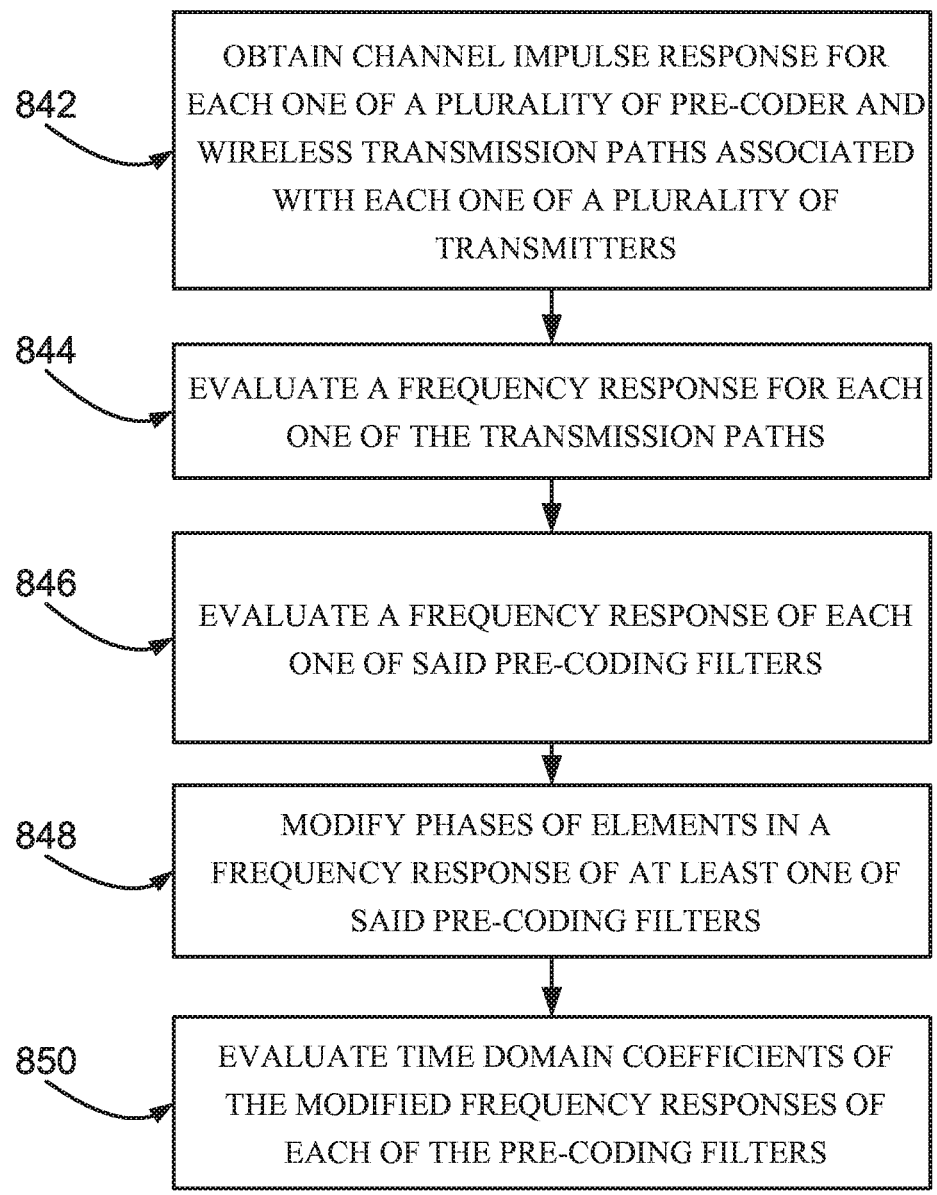
FIG. 8A is a simplified flow chart illustration of a method for updating coefficients of one or more pre-coding filters associated with a plurality of transmitters according to an example embodiment of the invention.

Reference is now made to FIG. 8A, which is a simplified flow chart illustration of a method for updating coefficients of one or more pre-coding filters associated with a plurality of transmitters according to an example embodiment of the invention.

FIG. 8A describes an example implementation of a method for updating pre-coding filter parameters, or pre-coding filter coefficients.

The method of FIG. 8A includes:

obtaining channel impulse response for each one of a plurality of pre-coder and wireless transmission paths associated with each one of the plurality of transmitters (842), where the paths include a pre-coding filter associated with the transmitter and a wireless channel from the transmitter to a receiver;

evaluating a frequency response for each one of the plurality of transmission paths (844), for example by performing FFT;

evaluating a frequency response of each one of the pre-coding filters (846);

modifying phases of elements in a frequency response of at least one of said pre-coding filters (848); and evaluating time domain coefficients of the modified frequency responses of each of the pre-coding filters (850).

In some embodiments a receiver calculates the impulse response(s) and sends to the transmitter. In some embodiments all calculations are performed in the receiver and sent to the transmitter, for optionally updating pre-coding filters.

Figure 8B:
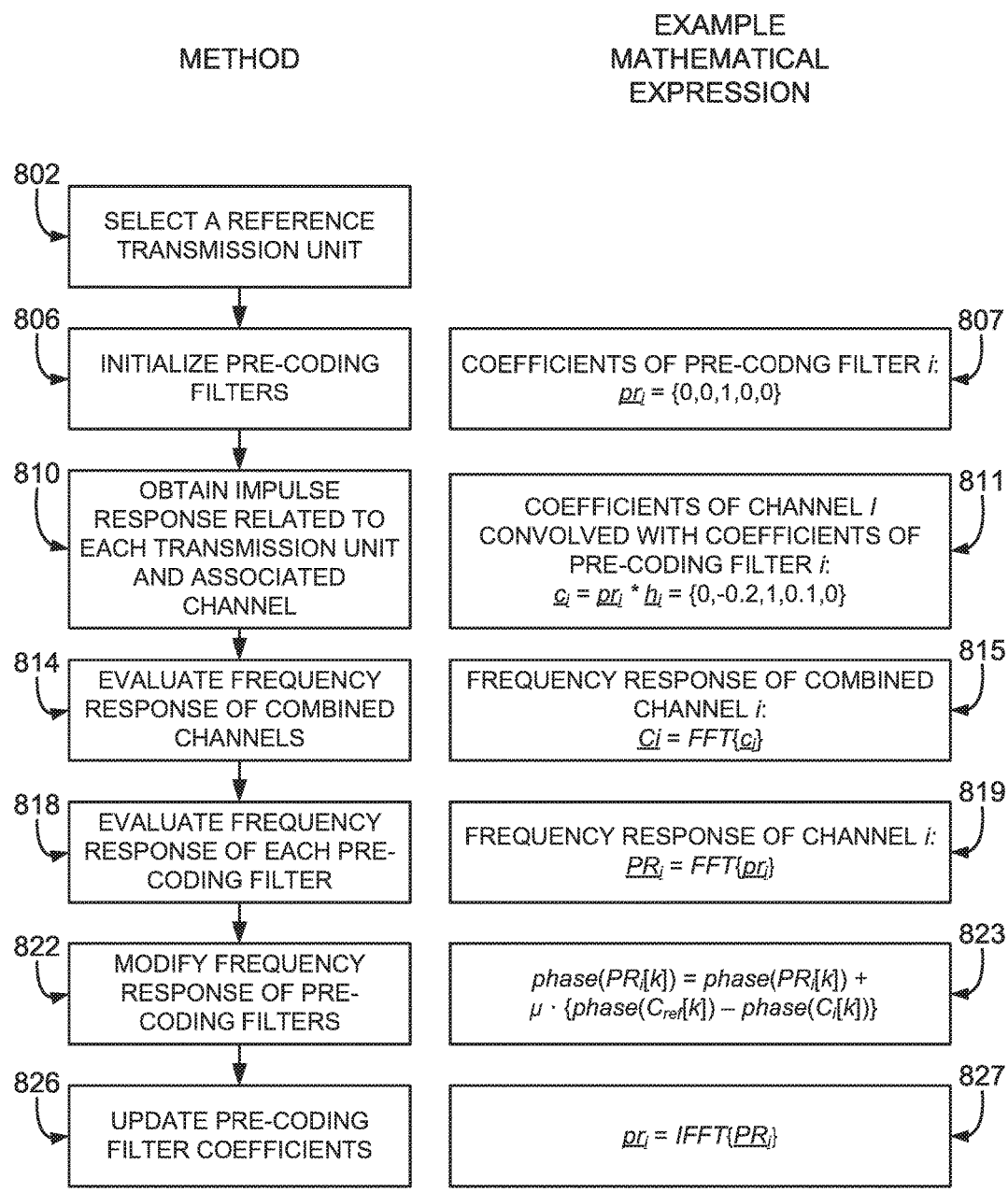
FIG. 8B is a simplified flow chart illustration of a method for updating coefficients of one or more pre-coding filters according to an example embodiment of the invention.

Reference is now made to FIG. 8B, which is a simplified flow chart illustration of a method for updating coefficients of one or more pre-coding filters according to an example embodiment of the invention.

FIG. 8B describes an example implementation of a method for updating pre-coding filter parameters, or pre-coding filter coefficients.

FIG. 8B depicts, on the left hand side, a text description of the method, and on the right hand side mathematical expressions describing the method.

The method of FIG. 8B includes:

selecting one of transmitting units used over the wireless link to be a reference unit (802), by way of a non-limiting example the transmitter 704 of FIG. 7.

Initializing all the pre-coding filters to some non-zero set of coefficients (806).

A non-limiting mathematical example of coefficients of a pre-coding filter i such as a FIR filter can be:

$pr_i=\{0,0,1,0,0\}$ (807 in FIG. 8B).

Other coefficient sets are also included in embodiments of the invention. It is noted that the coefficients may optionally iteratively update according to the presently described method.

For each one of the components of a received signal, obtain an impulse response related to the pre-coding filters of each transmission unit and a subsequent transmission channel from the transmission unit via an antenna and the wireless link to a receiver (810).

In some embodiments the impulse response is optionally obtained by sending preamble symbols S1, optionally as described in above-mentioned U.S. Patent Application Publication number 2014/0126664 of Mizrahi et al., and measuring the impulse response by convolving a received signal which has passed through a pre-coding filter of a transmission channel and over the wireless link of the transmission channel with sequences P1 and P2 also optionally as described in above-mentioned U.S. Patent Application Publication number 2014/0126664 of Mizrahi et al.

A non-limiting mathematical example of coefficients of channel i convolved with coefficients of pre-coding filter i:

$c_i = pr_i * h_i = \{0,-0.2,1,0.1,0\}$ (811 in FIG. 8B).

where $c_i$ is in a time domain.

Evaluate a frequency response of combined channels (combined channel meaning passing through a pre-coding filter followed by the wireless link) (814), by way of a non-limiting example by a Fourier transform of the impulse responses, optionally obtained as described above (in 810).

A non-limiting mathematical example of coefficients of frequency response of combined channel i:

$C_i = FFT\{c_i\}$ (815 in FIG. 8B).

where $C_i$ is in a frequency domain.

Evaluate a frequency response of each of the current pre-coding filters (818), by way of a non-limiting example by a Fourier transform of coefficients of the filter.

A non-limiting mathematical example of frequency response of channel i:

$PR_i = FFT\{pr_i\}$ (819 in FIG. 8B).

It is noted that evaluating a frequency response of each of the pre-coding filters may be done in a different order, since it is not dependent on a received signal, as are some of the above-mentioned steps 810 814.

It is noted that evaluating a frequency response of each of the pre-coding filters may be done on a transmitting side of the wireless link.

In some embodiments, the frequency response is performed by transforming into 16 or 32 coefficients in the frequency domain, although other numbers of coefficients are contemplated, in a range between 2 and 256 and even higher. This in contrast with, for example OFDM systems, where at a maximum only a single real or complex coefficient is applied to each tone/frequency.

Modify frequency response of all pre-coding filters except for that of the reference unit (822) by adding a phase shift.

The modifying is optionally done in order to optimize or maximize a received Signal to Noise Ratio (SNR), or to optimize or minimize Mean Square Error (MSE) of the received signal, or to optimize other error measurements as are known in the art.

A non-limiting mathematical example of adding the phase shift:

$phase(PR_i[k]) = phase(PR_i[k]) + \mu \cdot \{phase(C_{ref}[k]) - phase(C_i[k])\}$ (823 in FIG. 8B).

The above equation describes modifying a phase at one frequency k of a number of frequencies optionally obtained by a Fourier Transform of an associated pre-coding filter to the frequency domain. In some embodiments all the frequencies k are modified as described above.

In some embodiments the modifying of the phase is performed so as to shift a phase of received signals to a phase of the reference transmission unit and its associated combined channel.

In some embodiments $\mu$ is set to be smaller than 1, so as to partially shift the phase of non-reference combined channels toward the phase of the reference combined channel.

Perform IFFT and update coefficients of pre-coding filters (826), optionally except for the pre-coding filter in the reference unit.

A non-limiting mathematical example of obtaining impulse response from frequency response:

$pr_i = IFFT\{PR_i\}$ (827 in FIG. 8B).

The method described above with reference to FIG. 8B is optionally extended using one or more of the following:
  Multiplying an impulse response by a window function such as a Hamming window before evaluating the discrete Fourier transform.
  Smoothing an obtained frequency response of the pre-coding filters by multiplying the frequency response by a window function before evaluating the inverse Fourier transform as described with reference to FIG. 8B.
  Scaling pre-coding filters coefficients to maintain a fixed power level at a pre-coding filter's output.
  The pre-coding filters are unity-gain all-pass filters by design, that is, they do not amplify or decrease the signal power. The all-pass requirement may be relaxed to cover a bandwidth of the signals only (and not a whole sampling rate bandwidth).

In a second example method for updating coefficients of the pre-coding filter, it is assumed that there is a significant line-of-sight component in the channels. Each of the line-of-sight components is received with a possibly different delay. Additionally, multipath components may be present and generate a non-flat channel frequency response. In such cases the method optionally focuses on aligning the line-of-sight components from all transmitting units both in time and phase in a way which potentially optimizes performance. The method is described below with reference to FIGS. 9A and 9B.

Figure 9A:
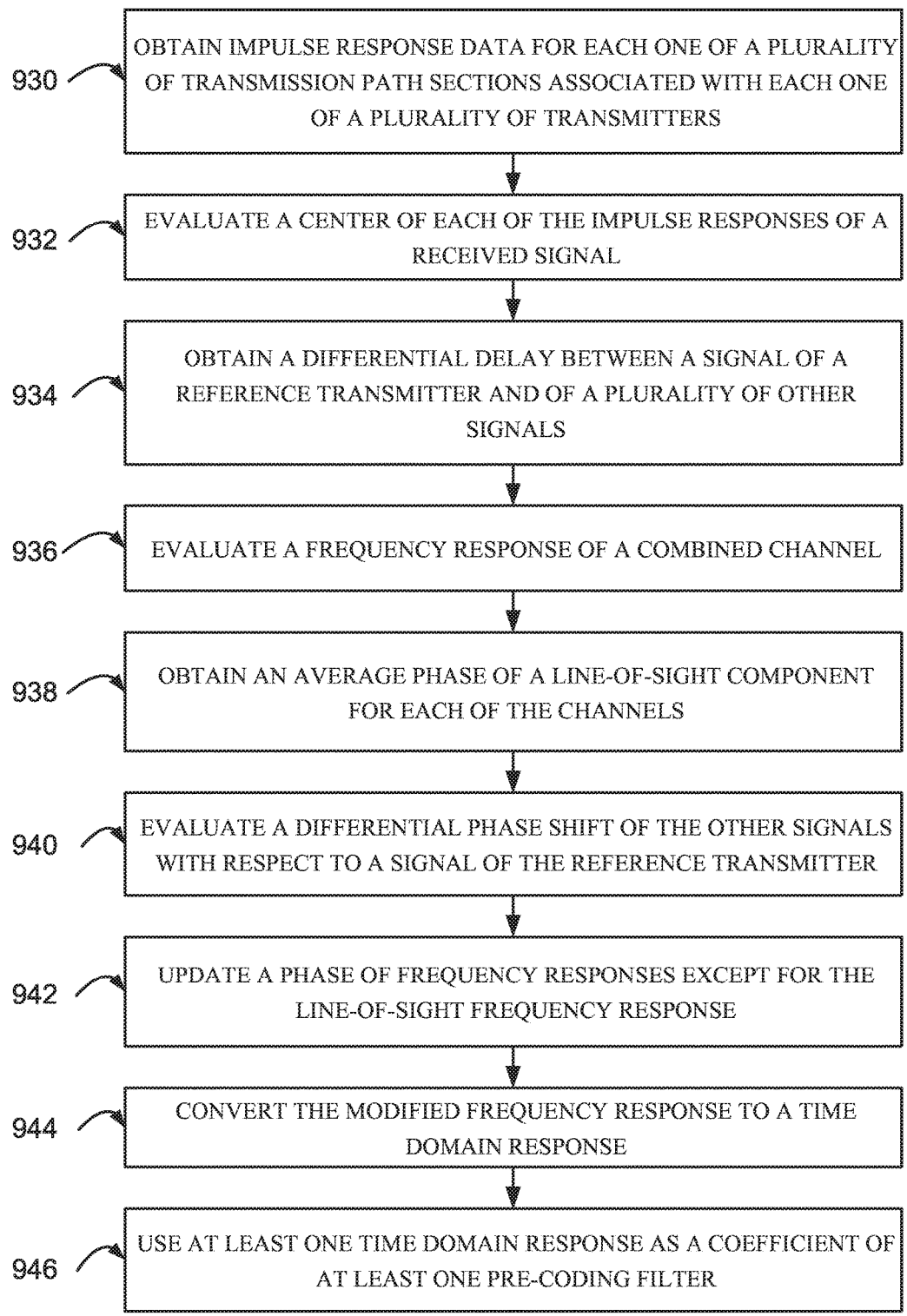
FIG. 9A is a simplified flow chart illustration of a method for updating coefficients of one or more pre-coding filters associated with a plurality of transmitters according to an example embodiment of the invention.
Figure 9B:
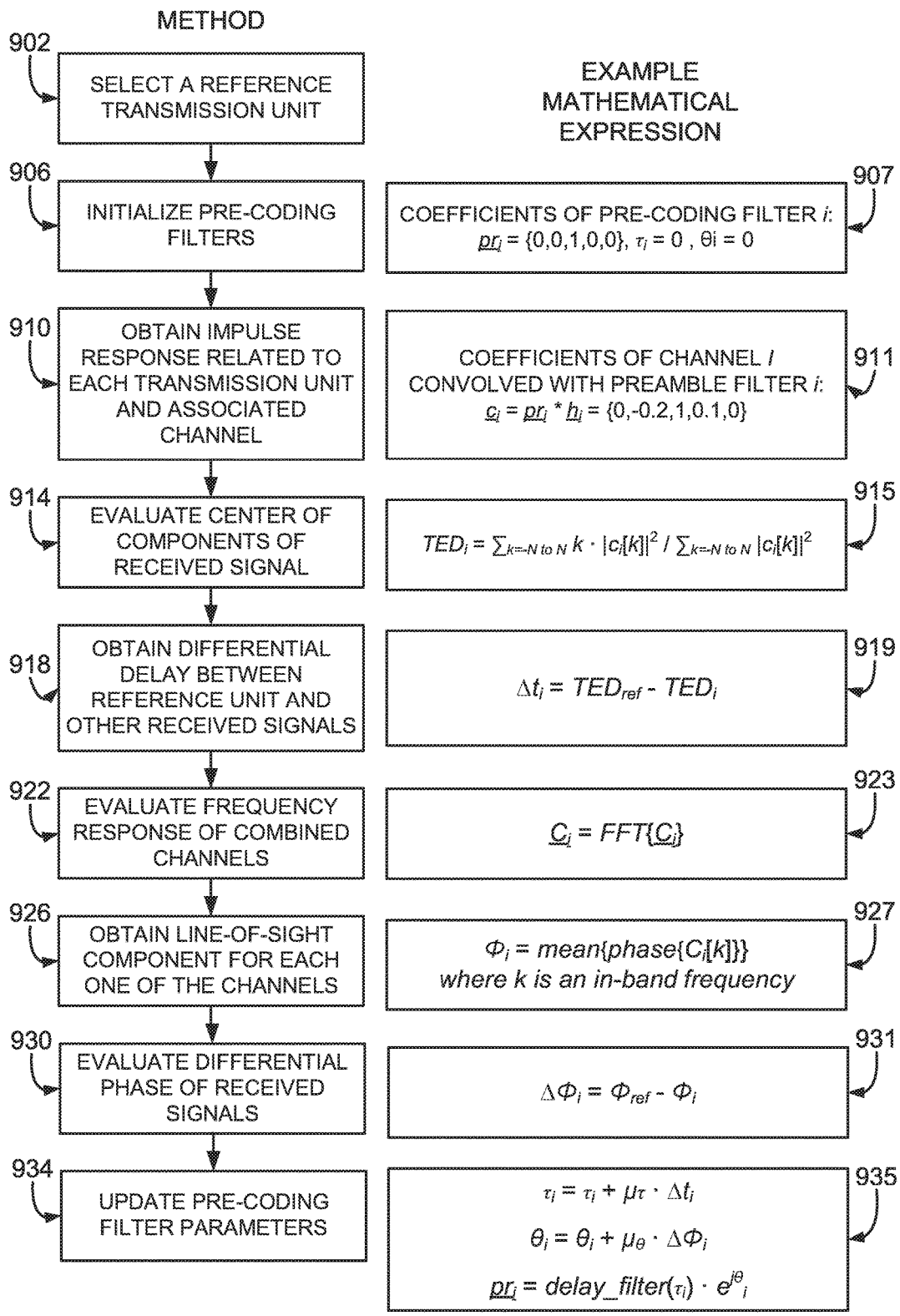
FIG. 9B is a simplified flow chart illustration of a method for updating coefficients of one or more pre-coding filters according to an example embodiment of the invention.

Before describing the method of the example embodiment depicted in FIGS. 9A and 9B, the following comments are made:
  Each pre-coding filter maintains two parameters: a delay $\tau$ and a phase shift $\theta$. The impulse response of each of the pre-coding filters is obtained by multiplying an all-pass filter having delay $\tau$ by a phase shift term with phase $\theta$.
  The method updates the two parameters for each of the pre-coding filters with a value calculated with respect to a reference transmitting unit.
  Updates may be multiplied by fraction coefficients $\mu_\tau$ and $\mu_\theta$ before applying them to the pre-coding filters.
  The pre-coding filters are preferably unity-gain all-pass filters, that is, the filters do not increase or decrease signal power. In some embodiments the all-pass feature of the filters is optionally relaxed to cover only a bandwidth of the signals and not the entire sampling rate bandwidth.
  It should be noted that since the channels may be dispersive, line-of-sight (LOS) components may be delayed. In some embodiments, a time-alignment of the LOS components is optionally based on heuristics and some alternatives will be described below.

Reference is now made to FIG. 9A, which is a simplified flow chart illustration of a method for updating coefficients of one or more pre-coding filters associated with a plurality of transmitters according to an example embodiment of the invention.

FIG. 9A describes an example implementation of a method for updating pre-coding filter coefficients.

The method of FIG. 9A includes:
  obtaining impulse response data for each one of a plurality of transmission path sections associated with each one of the plurality of transmitters (930), where the transmission path sections include a pre-coding filter associated with one of the plurality of transmitters and a wireless link from the one of the plurality of transmitters to a receiver;
  evaluating a center of each impulse response of a signal received at the receiver (932).
  In some embodiments discrete samples are taken of the signal over time, and optionally a time of a center is evaluated, optionally not at an exact time of sampling but at a value between samples;
  obtaining a differential delay between a signal of a reference transmitter and other signals (934) associated with each one of the plurality of other, non-reference transmitters;
  evaluating a frequency response of a combined channel (936);
  obtaining a phase of a line-of-sight component for each of the channels (938). In some embodiments the line-of-sight component phase is obtained by calculating an average phase of the frequency response (see 936) for each of the channels. In some embodiments the line-of-sight component phase is calculated as a phase of a frequency response at a center frequency;

evaluating a differential phase shift of each one of the other signals associated with each one of the non-reference transmitters with respect to the signal of the reference transmitter (940);

updating a phase of frequency responses, except for the line-of-sight frequency response, (942), optionally by subtracting a phase difference from the line-of-sight component and compensating for the differential phase shift by adding a phase shift of $2\pi f \cdot \tau$, where $\tau$ denotes a differential time delay and f denotes a baseband frequency, to the frequency responses except for the line-of-sight frequency response;

converting said modified frequency responses to time domain responses by performing an Inverse Fourier Transform (IFFT) (944); and using at least one of said time domain responses as a coefficient of at least one of said pre-coding filters (946).

In some embodiments the line-of-sight component mentioned in 938 is optionally selected, by way of a non-limiting example, as a component closest to an average phase.

In some embodiments the line-of-sight component mentioned in 938 is optionally selected, by way of a non-limiting example, as a component at a central, or zero, frequency.

Reference is now made to FIG. 9B, which is a simplified flow chart illustration of a method for updating coefficients of one or more pre-coding filters according to an example embodiment of the invention.

FIG. 9B describes an example implementation of a method for updating pre-coding filter coefficients.

FIG. 9B depicts, on the left hand side, a text description of the method, and on the right hand side mathematical expressions describing the method.

The method of FIG. 9B includes:

Selecting one of transmitting units used over the wireless link to be a reference unit (902), by way of a non-limiting example the transmitter 704 of FIG. 7.

Initializing all the pre-coding filters to some non-zero set of coefficients (906). It is noted that in some embodiments some pre-coder coefficients are initialized to zero, and may potentially increase in value over time.

A non-limiting mathematical example of coefficients of a pre-coding filter i such as a FIR filter can be:

$pr_i=\{0,0,1,0,0\}$, $\tau_i=0$, $\theta_i=0$ (907 in FIG. 9B).

For each one of the components of the received signal obtain an impulse response related to transmission units and pre-coding filters and transmission channels associated with the transmission units (910).

A non-limiting mathematical example of coefficients of channel I convolved with preamble filter i:

$c_i=pr_i*h_i=\{0,-0.2,1,0.1,0\}$ (911 in FIG. 9B).

Evaluate a center of impulse response for each one of the components of the received signal (914); by way of a non-limiting example according to any of the methods in above-mentioned U.S. Patent Application Publication number 2014/0126664 of Mizrahi et al.

A non-limiting mathematical example of calculating a center of each of the components of a received signal:

$TED_i=\Sigma_{k=-N}^{N} k \cdot |c_i[k]|^2 / \Sigma_{k=-N}^{N} |c_i[k]|^2$ (915 in FIG. 9B).

The term TED is used herein as a term for Timing Error Detector. i indicates an index number of a transmitter. In some embodiments an impulse response of each link (pre-coder+channel), which is optionally obtained via correlations, optionally lasts for several samples. k indicates an index number of a sample at a correlator output).

A non-limiting example method of a TED is described below with reference to FIGS. 9C and 9D.

Obtain a differential delay between a signal of the reference unit and the other signals (918).

A non-limiting mathematical example of calculating a differential delay between a signal of the reference unit and another signal i:

$\Delta t_i = TED_{ref} - TED_i$ (919 in FIG. 9B).

Evaluate frequency response of the combined channels (922), by way of a non-limiting example by a Fourier transform of impulse responses of the combined channels.

A non-limiting mathematical example of calculating a frequency response of the combined channels:

$C_i = FFT\{C_i\}$ (923 in FIG. 9B).

Obtain an average phase of a line-of-sight component for each of the channels (926).

In some embodiments a strongest component of a received signal is used as a line-of-sight component.

A non-limiting mathematical example of calculating a phase of a line-of-sight component for each of the channels:

$\Phi_i = \text{mean}\{\text{phase}\{C_i[k]\}\}$; where k is an in-band frequency (927 in FIG. 9B).

Evaluate differential phase of each of the signals with respect to that of the reference unit (930).

A non-limiting mathematical example of calculating a differential phase of a signal i with respect to that of the reference unit:

$\Delta\Phi_i = \Phi_{ref} - \Phi_i$ (931 in FIG. 9B).

Update the pre-coding filters of all channels except for that of the reference unit. Set the pre-coding filter parameters to a time delay filter with an updated time and an updated phase (934).

A non-limiting mathematical example of values for updating pre-coding filter parameters:

$\tau_i = \tau_i + \mu_\tau \cdot \Delta t_i$ $\theta_i = \theta_i + \mu_\theta \cdot \Delta\Phi_i$ $pr_i = \text{delay\_filter}(\tau_i) \cdot e^{j\theta_i}$ (935 in FIG. 9B).

Various embodiments optionally use various alternatives methods for calculating the phase shift and a time delay for updating pre-coding filter parameters for each channel.

An example embodiments described with reference to FIG. 9B calculates a time delay in the time domain, optionally using a timing error detector, and a phase shift is calculated in the frequency domain, optionally by averaging phase of in-band frequency components.

A mathematical notation of the example of FIG. 9B is as follows.

If a signal is delayed by $\tau$ seconds and phase rotated by an angle of $\theta$ degrees, an impulse response is given by:

$$h(t) = \delta(t-\tau) \cdot e^{j\theta} \qquad \text{Equation 1}$$

A corresponding frequency response is given by:

$$H(\omega) = e^{j\theta - j\omega\tau} \qquad \text{Equation 2}$$

A phase of the frequency response is given by:

$$\text{phase}\{H(\omega)\} = \theta - \omega\tau \qquad \text{Equation 3}$$

Optionally, by taking a symmetric range for $\omega$: $-\omega_0 \leq \omega \leq +\omega_0$, phase is averaged, and an estimate for $\theta$ is obtained.

The above description applies to the example embodiment depicted in FIG. 9B.

A time delay according to the example embodiment of FIG. 9B is optionally evaluated in the time domain using a timing error detector (TED).

In some embodiments, the timing error is optionally calculated in the frequency domain by calculating a mean value of a slope of a phase of the frequency response.

Mathematically this may be phrased as:

$$\hat{\tau} = -\text{mean}\left\{\frac{\partial(\text{phase}\{H(\omega)\})}{\partial \omega}\right\}$$ Equation 4

In some embodiments a mean operation is optionally replaced by a weighted mean, where extra weight is optionally given to values with a better Signal to Noise Ration (SNR).

It is noted that higher frequencies may be more sensitive to timing errors. The higher frequencies can optionally serve as better detectors, potentially less sensitive to additive noise. In some embodiments, instead of simply averaging estimated delay in all frequencies, a larger weight is given in the above-described averaging process to delay estimated by high frequency components.

In some embodiments, the timing error is optionally calculated in the frequency domain by least-squares fitting a value of a slope of a phase of the frequency response.

In some embodiments, phase rotation is optionally evaluated in the time domain by calculating a phase for any given frequency. For example, for a center frequency ω=0 the phase rotation is optionally obtained by:

$$\phi_i = \text{phase}\left\{\sum_k c_{i,k}\right\}$$ Equation 5

The phase rotation is taken to represent the phase rotation of the received signal for the given frequency.

In some embodiments phase compensation is performed by search algorithms instead of using the preamble sequences. An example such search algorithm optionally follows the following steps:

evaluate a received signal level (RSL) at a receiving antenna;

send a request for a transmitter to shift the phase by a phase step θ; and if the received signal level increases in response to the phase shift then repeat the previous step.

If the received signal level (RSL) has decreased then invert the sign of θ and repeat the previous step. Optionally, a stop condition is reached when a maximum of the RSL is detected. At such a point a sign of the phase shift θ will switch.

In some embodiments the above method is optionally extended by modifying an absolute value of the phase step, or by optimizing a different criterion such as a mean squared error at a receiver output, a symbol error rate, and so on.

In some embodiments timing offset is optionally compensated using the same method.

Figure 9C:
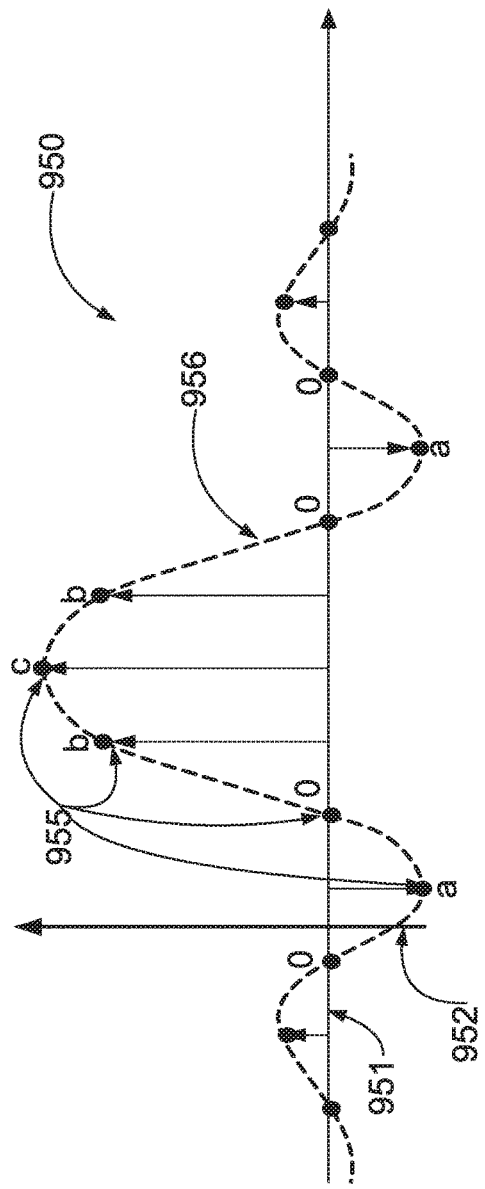
FIG. 9C is a simplified graph of an output of a Timing Error Detector (TED) for a delta-function section with perfect timing and two samples per symbol according to an example embodiment of the invention.

Reference is now made to FIG. 9C, which is a simplified graph 950 of an output of a Timing Error Detector (TED) for a delta-function section with perfect timing and two samples per symbol according to an example embodiment of the invention.

The graph 950 has an X-axis 951 of time, and a Y-axis 952 of magnitude. Values 955 of output of the TED are depicted in the graph 950, and the values 955 are also connected by a line 956 which depicts the delta function.

Cross correlation between S1 and P1, with 2 samples per symbol and with perfect timing may appear as depicted in FIG. 9C.

It is noted that symmetry is present in the TED output depicted in FIG. 9C.

If however, there is a timing offset between a received signal and a sequence P1, the symmetry of FIG. 9C is altered. For example, the two values adjacent to a peak value will not have equal magnitude.

Figure 9D:
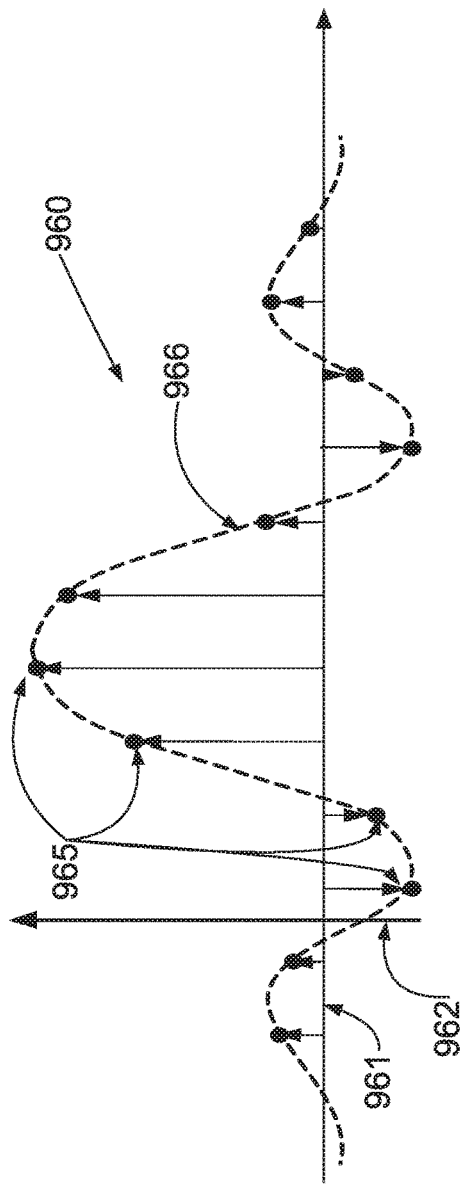
FIG. 9D is a simplified graph of an output of a Timing Error Detector (TED) for a delta-function section with a non-perfect timing with two samples per symbol according to an example embodiment of the invention.

Reference is now made to FIG. 9D, which is a simplified graph 960 of an output of a Timing Error Detector (TED) for a delta-function section with a non-perfect timing with two samples per symbol according to an example embodiment of the invention.

The graph 960 has an X-axis 961 of time, and a Y-axis 962 of magnitude. Values 965 of output of the TED are depicted in the graph 960, and the values 965 are also connected by a line 966 which depicts a shifted delta function relative to locations of the values 965.

Cross correlation between S1 and P1, with 2 samples per symbol and with a timing offset, also termed timing error, may appear as depicted in FIG. 9D.

Extending Beam-Forming Methods to More than a Single Receiving Antenna

When more than a single receiving antenna exists, as shown for example in FIG. 3, there are example beam forming methods which direct a transmitted beam in a direction between the receiving antennas, so as to potentially optimize reception quality and/or decrease interference between the transmitted beams at the receiving antennas.

The above-mentioned methods require collaboration between the receivers in order to provide a suitable feedback to the transmitting devices for optimizing the transmitted beams also termed directing a combined beam.

Without presenting a technical derivation, it is noted that for a general channel, a direction in which a beam should be transmitted is determined by an eigen-vector corresponding to a largest eigen-value of a channel matrix per frequency band. This result is used in multi-carrier systems such as OFDM.

An example embodiment uses a simpler alternative. The simpler alternative is now presented and compared to the optimal method used by the multi-carrier systems such as OFDM.

The example embodiment using the simpler alternative makes the following assumptions:

There is a line-of-sight between all transmitting and receiving elements.

Attenuation between all transmitting and receiving elements is approximately identical and is optionally ignored. In practice this assumption does not exactly hold, since beam forming is intended to provide space diversity for combating channel fading in addition to an improved system gain, and space diversity is intended to provide a lesser attenuated transmission channel when another channel suffers from high attenuation. However, for sake of comparison, the assumption is useful.

Some embodiments use, as an alternative to optimal beam forming, a selection of one of the receiving units as a master receiving unit, and direct the transmitted beam to the master receiving unit as if there are no other receiving antennas. Such a situation is depicted, for example, in FIG. 10, where a combined beam is directed to receiver 1A.

Figure 10:
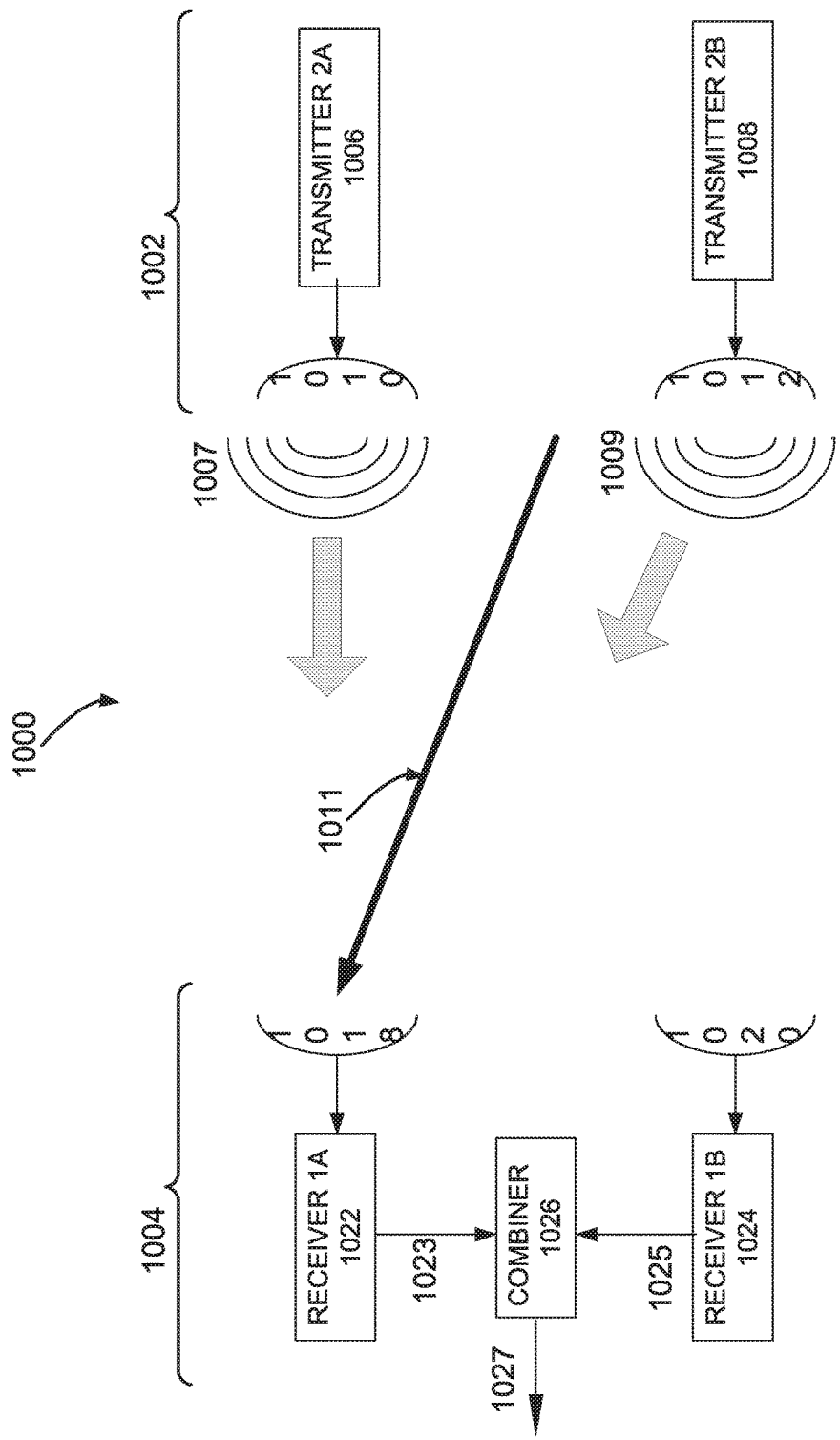
FIG. 10 is a simplified illustration of a wireless link using space diversity and beam forming according to an example embodiment of the invention.

Reference is now made to FIG. 10, which is a simplified illustration of a wireless link 1000 using space diversity and beam forming according to an example embodiment of the invention.

Two transmitters 1006 1008 produce two signals 1007 1009, which are transmitted from two antennas 1010 1012 from a first side 1002 of the wireless link 1000, and received at a second side 1004 of the wireless link 1000 by two separated antennas 1018 1020 and two receivers 1022 1024. Two signals 1023 1025 produced by the two receivers 1022 1024 are combined by a combiner 1026, producing a combined signal 1027.

The two transmitters 1006 1008 produce the two signals 1007 1009 for transmission such that a combined beam 1011 is directed at one of the receiving antennas, for example receiving antenna 1018.

For clearness sake, only one direction of transmission via the wireless link 1000 is depicted in FIG. 10, but in example embodiments a symmetric arrangement of transmitters, receivers, and combiners using the same antennas operate in a reverse direction over the wireless link 1000, as can be understood by a person skilled in the art.

Potential benefits of the above-described method include:
Complexity of beam forming is low and independent of a number of receiving elements.
Performance when a distance between the receiving antennas is small is close to optimal, as will be shown below.

As an example for obtained performance of the above-mentioned example embodiments a system with two antennas at both sides of a wireless link is demonstrated. A distance between the two receiving antennas is taken to be approximately equal to a distance between the two transmitting antennas, and denoted by d. The equal distance is chosen to simplify the presentation, and does not affect accuracy of the following derivation.

A distance parameter $d_{ref}$ is defined as follows:

$$d_{ref} = \sqrt{\frac{C \cdot L}{f \cdot N}} \quad \text{Equation 6}$$

Where C denotes the speed of light, L denotes a distance between the transmitting and receiving antennas, f denotes a carrier frequency and N denotes a number of antennas at each side of the link. In the following example, N=2.

Figure 11:
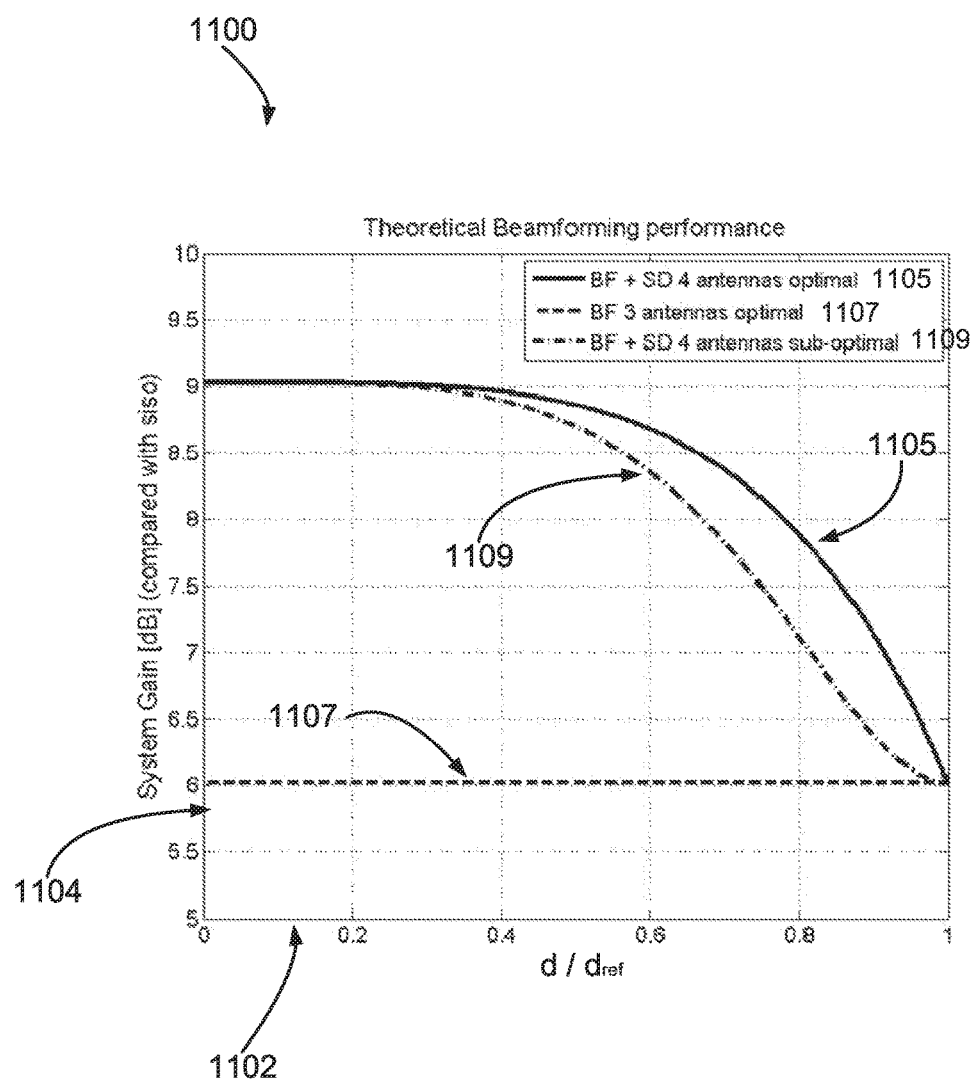
FIG. 11 is a graph of beam forming performance for some example embodiments of the invention.

Reference is now made to FIG. 11, which is a graph 1100 of beam forming performance for some example embodiments of the invention.

FIG. 11 compares optimal beam forming for a case of 4 antennas (solid line 1105), optimal beam forming for a case of 3 antennas (dashed line 1107) and sub-optimal beam forming for a case of 4 antennas (dot-dash line 1109).

It is noted that the term optimal beam forming is used in a sense of combined SNR (SNR after combining signals) and sub-optimal is used in a sense of performance obtained by an example method as described within the present specification.

The graph 1100 has an x-axis 1102 of $d/d_{ref}$, and a y-axis 1104 of system gain in units of dB, as compared to a SISO (single input single output) system without Space Diversity (SD) or beam forming (BF).

The solid line 1105 demonstrates performance in terms of an additional system gain over SISO with optimal beam-forming as obtained by directing a transmitted beam optimally in between the receiving antennas.

The dash dot line 1109 demonstrates an obtained system gain improvement when the transmitted beam is directed at one of the receiving antennas. The figure demonstrates that a degradation due to the sub-optimal algorithm is less than 1 dB, and furthermore that the degradation reduces as the distance between the transmitting and receiving antennas becomes larger, and also as the distance between the receiving antennas becomes smaller.

In some embodiments selection of the receiving unit which acts as a master receiving unit and affects the beam-forming method is performed when the communication system is initially configured.

In some embodiments, selection of the receiving unit which acts as a master receiving unit and affects the beam-forming method is performed adaptively, by polling the receiving units and determining which receiving unit receives a better signal, in terms of amplitude and/or signal to noise ratio. It is noted that the above depends on the beam direction. If one receiver is better than another, in terms of internal noise for example, but the beam is directed to the other, the better receiver will still get a weaker signal with a lower quality.

Extending Beam-Forming Methods to More than a Single Master Receiver

In some of the example embodiments presented above feedback was optionally provided from one specific receiver denoted as a master receiver to a specific transmitter denoted as a master transmitter.

In some cases it is beneficial for a slave receiver to provide feedback for updating the transmitted signal from a slave transmitter. Such a configuration potentially maintains a low complexity method in which a single receiver communicates with a single transmitter, as described previously with reference to example embodiments.

Figure 12:
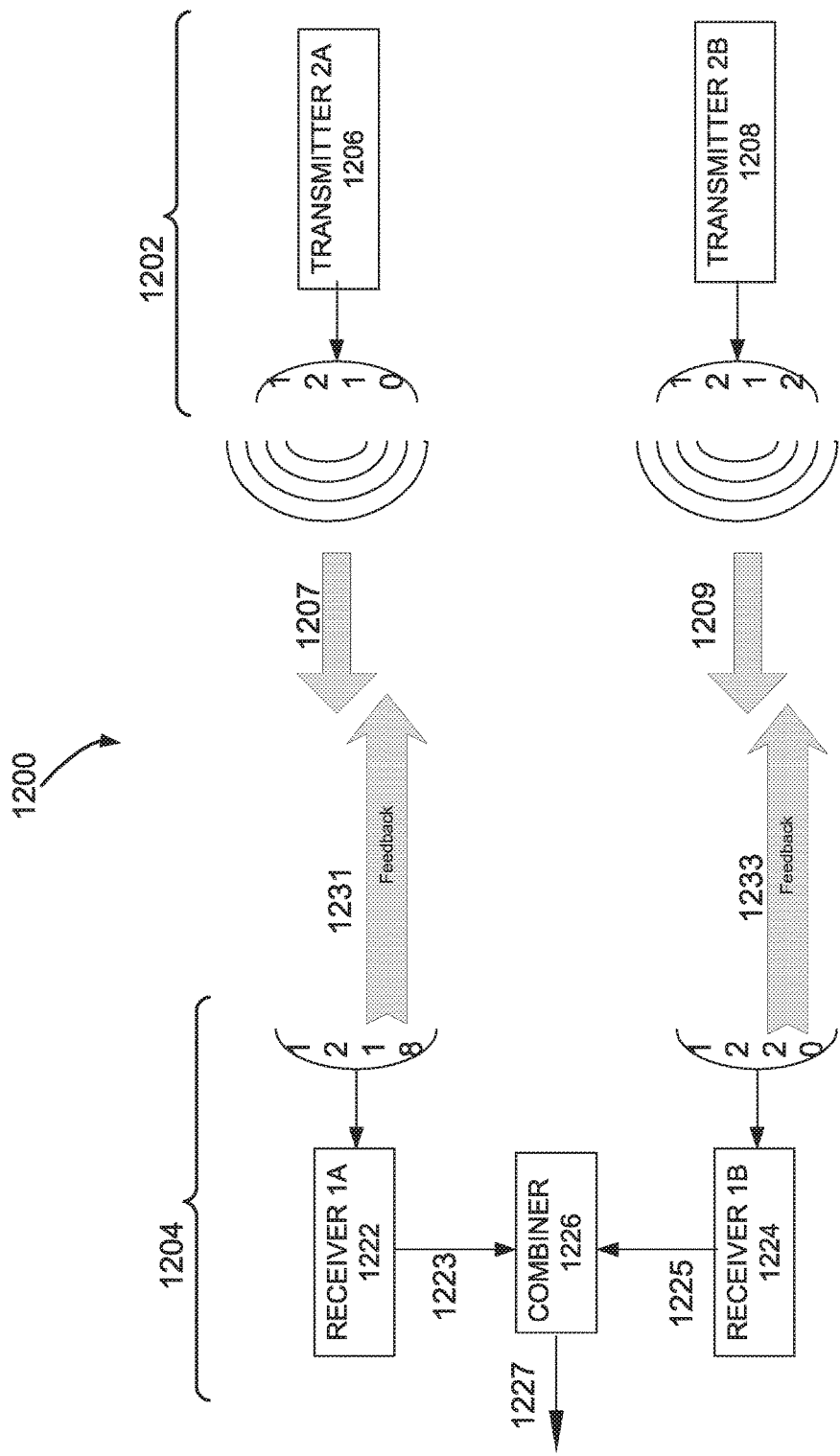
FIG. 12 is a simplified illustration of a 4-antenna system with double feedback according to an example embodiment of the invention.

Reference is now made to FIG. 12, which is a simplified illustration of a 4-antenna system with double feedback according to an example embodiment of the invention.

FIG. 12 depicts two transmitters 1206 1208 producing two signals 1207 1209, which are transmitted from two antennas 1210 1212 from a first side 1202 of a wireless link 1200, and received at a second side 1204 of the wireless link 1200 by two separated antennas 1218 1220 and two receivers 1222 1224. Two signals 1223 1225 received by the two receivers 1222 1224 are combined by a combiner 1226, producing a combined signal 1227.

For clearness sake, only one direction of transmission via the wireless link 1200 is depicted in FIG. 12, but in example embodiments a symmetric arrangement of transmitters, receivers, and combiners using the same antennas operate in a reverse direction over the wireless link 1200, as can be understood by a person skilled in the art.

In some embodiments feedback signals 1231 1233 are sent from the receivers 1222 1224 to the transmitters 1206 1208, with each of the feedback signals being similar to a single feedback described above with reference to FIG. 7.

In some embodiments, additional information, such as, by way of a noon-limiting example, information about a received signal level (RSL) in each of the receivers is optionally provided separately to each of the associated transmitters.

In some embodiments, when the RSL of receiver 1A 1222 is larger than the RSL of receiver 1B 1224, the transmitter 1A 1206 optionally refrains from updating pre-coding filter parameters for the signal 1207 transmitted from the transmitter 2A 1206, while the transmitter 2B 1208 optionally does update pre-coding filter parameters for the signal 1209 transmitted from the transmitter 2B 1208. As a result, the RSL of the receiver 1B is increased, potentially obtaining a better quality at the combiner 1226 output.

Similarly, if the RSL of receiver 1B 1224 is higher than the RSL of receiver 1A 1222, the transmitter 2A 1206 optionally acts to improve the RSL of the receiver 1A 122 by applying the beam-forming method described above.

It is expected that during the life of a patent maturing from this application many relevant transmitters and receivers will be developed and the scope of the terms transmitter and receiver are intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A single-carrier-modulation communication system for transmitting data over a wireless link, the communication system comprising:

on a first side of a wireless link one single-carrier-modulation receiver associated with a single antenna;

on a second side of said wireless link a plurality of antennas and a plurality of single-carrier-modulation transmitters, each one of the plurality of transmitters associated with one of said plurality of antennas, the transmitters each further associated with a pre-coding filter; and said plurality of transmitters are arranged to each transmit same data via a respectively associated pre-coding filter and said associated antenna, using said pre-coding filters to perform beam-forming to said one receiver;

in which:

each one of said plurality of transmitters comprises a pre-coding filter; and parameters defining at least one of said pre-coding filters are designed to be updated as follows:

obtaining impulse response parameters for each one of a plurality of transmission path sections associated with each one of said plurality of transmitters, wherein said transmission path sections comprise a pre-coding filter associated with said one of said plurality of transmitters and a wireless link from said one of said plurality of transmitters to a receiver;

evaluating a center of each of the components of a received signal;

obtaining a differential delay between a signal of a reference transmitter and each one of a plurality of other signals associated with each one of said plurality of transmitters;

evaluating a frequency response of a transmission path which includes the pre-coding filter and the wireless link;

obtaining a phase of a line-of-sight component for each of the transmission paths;

evaluating a differential phase shift of each one of a plurality of other frequency responses associated with each one of said plurality of transmitters with respect to said frequency response of said reference transmitter; and updating a phase of frequency responses except for said line-of-sight frequency response by:

subtracting a phase difference from said line-of-sight component; and compensating for said differential delay by adding a phase shift of $2\pi f \cdot \tau$, where $\tau$ denotes a differential time delay and f denotes a baseband frequency, to said frequency responses except for said line-of-sight frequency response.

2. The single-carrier-modulation communication system of claim 1, in which:

parameters defining at least one of said pre-coding filters are designed to be modified as follows:

obtaining impulse response data for each one of a plurality of transmission path sections associated with each one of said plurality of transmitters, wherein said transmission path sections comprise a pre-coding filter associated with said one of said plurality of transmitters and a wireless link from said one of said plurality of transmitters to a receiver;

evaluating a frequency response of a transmission path section which includes the pre-coding filter and the wireless link comprising summing of all of said transmission path sections;

evaluating a frequency response of each one of said pre-coding filters;

modifying phases of elements in a frequency response of at least one of said pre-coding filters; and evaluating time domain coefficients of said modified frequency responses of each of said pre-coding filters, and updating at least one parameter of at least one pre-coding filter based on said evaluating time domain coefficients, thereby performing beam forming of at least one associated transmitter.

3. The single-carrier-modulation communication system of claim 1, wherein said first side of said wireless link comprises a plurality of receivers each one with an associated antenna, and wherein said plurality of transmitters are arranged to each transmit same data via said associated antenna to said plurality of receivers.

4. The single-carrier-modulation communication system of claim 3, in which one of said plurality of receivers is defined as a reference receiver.

5. The single-carrier-modulation communication system of claim 2, wherein:

said first side of said wireless link comprises two receivers each one with an associated antenna;

said plurality of transmitters comprises two transmitters arranged to each transmit same data via said associated antenna to said two receivers;

said two receivers are arranged to send feedback comprising data describing said impulse response and a quality measure from each transmitter as received by said two receivers; and said two transmitters are arranged to use said data describing signals received by said two receivers to update parameters of at least one of said pre-coding filters.

6. The single-carrier-modulation communication system of claim 5, wherein each one of said two transmitters is arranged to use said data received from both of said receivers and describing signals received by said two receivers.

7. The single-carrier-modulation communication system of claim 1, wherein said transmitters are arranged to transmit at a fixed transmission power from said associated antennas.

8. A method for beam forming in a single-carrier-modulation communication system, the method comprising:

obtaining channel impulse response for each one of a plurality of pre-coder and wireless transmission paths associated with each one of a plurality of single-carrier-modulation transmitters, wherein said transmission paths comprise a pre-coding filter associated with said one of said plurality of transmitters and a wireless channel from said one of said plurality of transmitters to a single-carrier-modulation receiver;

evaluating a frequency response for each one of said plurality of transmission paths;

evaluating a frequency response of each one of said pre-coding filters;

modifying phases of elements in a frequency response of at least one of said pre-coding filters, thereby updating at least one coefficient of said at least one of said pre-coding filters; and evaluating time domain coefficients of said modified frequency responses of each of said pre-coding filters, in which said modifying phases comprises converting said pre-coding filters to a frequency domain and modifying said phase, based on a difference between a phase of a received signal from a reference transmission unit and a phase of a received signal from a transmission unit associated with said pre-coding filter.

9. The method of claim 8, and further comprising:

selecting one of said plurality of transmitters to be a reference transmitter, and refraining from modifying parameters for said reference transmitter.

10. The method of claim 8, and further comprising:

transmitting from said plurality of transmitters to a plurality of single-carrier-modulation receivers;

selecting one of said plurality of receivers to be a reference receiver; and performing said obtaining channel impulse response, said evaluating a frequency response, said evaluating a frequency response, said modifying phases, and said evaluating time domain coefficients based on a received signal at said reference receiver.

11. The method of claim 8, in which said obtaining channel impulse response for each one of said plurality of transmission path sections associated with each one of said plurality of transmitters comprises calculating a series of correlations between a preamble signal associated with said transmitter and a symbol sequence in said receiver at a plurality of relative lags.

12. The method of claim 8, in which said evaluating a frequency response of a combined transmission path comprises performing a Fourier Transform on said impulse responses.

13. The method of claim 8, in which said evaluating a frequency response of each one of said pre-coding filters comprises performing a Fourier transform of coefficients of each one of said pre-coding filters.

14. A method for beam forming in a single-carrier-modulation communication system, the method comprising:

obtaining impulse response data for each one of a plurality of transmission path sections associated with each one of a plurality of single-carrier-modulation transmitters, wherein said transmission path sections comprise a pre-coding filter associated with said one of said plurality of transmitters and a wireless link from said one of said plurality of transmitters to a receiver;

evaluating a center of each one of the impulse responses of a received signal;

obtaining differential delay between a signal of a reference transmitter and each one of a plurality of other signals associated with each one of said plurality of transmitters;

evaluating a frequency response of a combined channel of each one of the plurality of other signals;

obtaining an average phase of a line-of-sight component for each of the combined channels;

evaluating a differential phase of each one of said plurality of other signals associated with each one of said plurality of transmitters with respect to said signal of said reference transmitter; and modifying a phase of frequency responses except for said line-of-sight frequency response by:

subtracting a phase difference from said line-of-sight component; and compensating for said differential delay by adding a phase shift of $2\pi f \cdot \tau$, where $\tau$ denotes a differential time delay and f denotes a baseband frequency, to said frequency responses except for said line-of-sight frequency response;

converting said modified frequency responses to time domain responses by performing an Inverse Fourier Transform (IFFT); and using at least one of said time domain responses as a coefficient of at least one of said pre-coding filters, thereby updating at least one coefficient of said at least one pre-coding filter associated with a plurality of single-carrier-modulation transmitters.

15. The method of claim 14, in which said evaluating a center of each of the components of a received signal comprises calculating:

$$TED_i = \Sigma_{k=-N \text{ to } N} k \cdot |c_i[k]|^2 / \Sigma_{k=-N \text{ to } N} |c_i[k]|^2$$

where k is an index of an individual impulse response; and $c_i$ is a component of an i th received signal from an i th transmitter.

16. The method of claim 15, in which said obtaining a differential delay between a signal of a reference transmitter and each one of a plurality of other signals associated with each one of said plurality of transmitters comprises calculating:

$$\Delta t_i = TED_{ref} - TED_i$$

where $TED_{ref}$ is a Timing Error Detector (TED) as applied to the reference transmitter, and $TED_{ref}$ is a TED as applied to a transmitter with index number i.

17. The method of claim 14, in which said updating said pre-coding filters comprises calculating an inverse Fourier transform of updated frequency responses.

18. The method of claim 14, and further comprising:

transmitting from said plurality of single-carrier-modulation transmitters to a plurality of single-carrier-modulation receivers;

selecting one of said plurality of receivers to be a reference receiver; and performing said obtaining channel impulse response, said evaluating a frequency response, said evaluating a frequency response, said modifying phases, and said evaluating time domain coefficients based on a received signal at said reference receiver.

19. The method of claim 14, in which said obtaining impulse response data for each one of said plurality of transmission path sections associated with each one of said plurality of single-carrier-modulation transmitters comprises calculating a series of correlations between a preamble signal associated with said transmitter and a symbol sequence in said receiver at a plurality of relative lags.

* * * * *